US010773568B2

(12) United States Patent
Ogasawara et al.

(10) Patent No.: US 10,773,568 B2
(45) Date of Patent: Sep. 15, 2020

(54) FLUID-HEATING DEVICE

(71) Applicant: CALSONIC KANSEI CORPORATION, Saitama-shi, Saitama (JP)

(72) Inventors: Takeshi Ogasawara, Saitama (JP); Naohisa Kamiyama, Saitama (JP); Hiroki Yoshioka, Saitama (JP); Takashi Otsuka, Saitama (JP); Daiju Suzuki, Saitama (JP); Eiji Yamatani, Saitama (JP)

(73) Assignee: CALSONIC KANSEI CORPORATION, Saitama-Shi (JP)

( * ) Notice: Subject to any disclaimer, the term of this patent is extended or adjusted under 35 U.S.C. 154(b) by 287 days.

(21) Appl. No.: 15/740,412

(22) PCT Filed: Jun. 22, 2016

(86) PCT No.: PCT/JP2016/068579
§ 371 (c)(1),
(2) Date: Dec. 28, 2017

(87) PCT Pub. No.: WO2017/002690
PCT Pub. Date: Jan. 5, 2017

(65) Prior Publication Data
US 2018/0186215 A1 Jul. 5, 2018

(30) Foreign Application Priority Data

Jun. 30, 2015 (JP) ................................ 2015-130688
Oct. 6, 2015 (JP) ................................ 2015-198785
May 23, 2016 (JP) ................................ 2016-102133

(51) Int. Cl.
*B60H 1/22* (2006.01)
*H05B 3/82* (2006.01)
(Continued)

(52) U.S. Cl.
CPC ............ *B60H 1/2221* (2013.01); *F24H 1/009* (2013.01); *F24H 1/121* (2013.01); *F24H 1/122* (2013.01);
(Continued)

(58) Field of Classification Search
CPC .......... B60H 1/2221; B60H 2001/2278; F24H 1/009; F24H 1/121; F24H 1/122;
(Continued)

(56) References Cited

U.S. PATENT DOCUMENTS 4,459,466 A * 7/1984 Nakagawa ......... G05D 23/2401
165/103
5,057,672 A * 10/1991 Bohlender ............ F24H 3/0405
219/202

(Continued)

FOREIGN PATENT DOCUMENTS

CN         2807124 Y    8/2006
DE    10 2011 054 406 A1   4/2013
(Continued)

*Primary Examiner* — Dana Ross
*Assistant Examiner* — Joseph W Iskra
(74) *Attorney, Agent, or Firm* — Foley & Lardner LLP

(57) ABSTRACT

A fluid-heating device for heating fluid includes: a heater having a heat generating part, the heat generating part being configured to generate heat upon application of current; an electric component configured to control the application of the current to the heater; a tank having an opening portion, the tank being configured to accommodate the heat generating part; a top-plate portion configured to close the opening portion of the tank, the top-plate portion being configured to form a fluid chamber through which the fluid flows; and a first communication port and a second communication port configured to allow the fluid to flow through the fluid chamber; wherein the electric component is provided on an outer side of the fluid chamber along the top-plate portion.

5 Claims, 12 Drawing Sheets

(51) Int. Cl.
*F24H 9/18* (2006.01)
*F24H 9/20* (2006.01)
*F24H 1/00* (2006.01)
*F24H 1/12* (2006.01)
*F24H 1/14* (2006.01)
*F24H 3/04* (2006.01)
*F24H 3/08* (2006.01)
*H05B 3/50* (2006.01)
*F24H 3/10* (2006.01)

(52) U.S. Cl.
CPC ........... *F24H 1/142* (2013.01); *F24H 3/0435* (2013.01); *F24H 3/085* (2013.01); *F24H 9/1827* (2013.01); *F24H 9/2028* (2013.01); *H05B 3/50* (2013.01); *H05B 3/82* (2013.01); *B60H 2001/2278* (2013.01); *F24H 3/102* (2013.01); *F24H 2250/04* (2013.01); *H05B 2203/012* (2013.01)

(58) Field of Classification Search
CPC .... F24H 1/142; F24H 2250/04; F24H 3/0435; F24H 3/085; F24H 3/102; F24H 9/1827; F24H 9/2028; H05B 2203/012; H05B 3/50; H05B 3/82
USPC ........... 392/496; 219/202; 165/41, 151, 175, 165/181
See application file for complete search history.

(56) References Cited

U.S. PATENT DOCUMENTS

| | | | | |
|---|---|---|---|---|
| 5,256,857 A | * | 10/1993 | Curhan | F24H 3/0411 219/202 |
| 5,377,298 A | * | 12/1994 | Yang | H05B 3/148 219/504 |
| 5,471,034 A | * | 11/1995 | Kawate | B60H 1/2225 219/483 |
| 5,562,844 A | * | 10/1996 | Bohlender | F24H 3/0405 219/505 |
| 5,995,711 A | * | 11/1999 | Fukuoka | B60H 1/00328 219/202 |
| 6,055,360 A | * | 4/2000 | Inoue | B60H 1/00321 165/151 |
| 6,093,909 A | * | 7/2000 | Beetz | B60H 1/2221 219/202 |
| 6,124,570 A | * | 9/2000 | Ebner | B60H 1/00328 219/202 |
| 6,178,292 B1 | * | 1/2001 | Fukuoka | F24H 1/009 165/175 |
| 6,265,692 B1 | * | 7/2001 | Umebayahi | B60H 1/00064 165/299 |
| 6,289,177 B1 | | 9/2001 | Finger et al. | |
| 8,948,582 B2 | * | 2/2015 | Kominami | F24H 9/20 165/175 |
| 2013/0230302 A1 | | 9/2013 | Kominami et al. | |
| 2015/0221466 A1 | | 8/2015 | Suzuki et al. | |

FOREIGN PATENT DOCUMENTS

| | | |
|---|---|---|
| JP | 2012-17031 A | 1/2012 |
| JP | 2013-180690 A | 9/2013 |
| JP | 2014-053288 A | 3/2014 |
| JP | 2014-084024 A | 5/2014 |
| JP | 2014-228252 A | 12/2014 |
| JP | 2015-137783 A | 7/2015 |

* cited by examiner

FLUID-HEATING DEVICE

TECHNICAL FIELD

The present invention relates to a fluid-heating device for heating a fluid.

BACKGROUND ART

JP2015-137783A discloses a fluid-heating device in which a helical-shaped electric heater is accommodated in a tank through which a fluid flows.

At both side portions of the tank, openings of a supply passage and a discharge passage are formed so as to face each other. The fluid supplied from the supply passage absorbs heat from the heater while flowing through the tank in one direction and is discharged from the discharge passage.

SUMMARY OF INVENTION

With the above-mentioned fluid-heating device, electric components, such as temperature sensor, switching element, and so forth, for controlling application of current to the heater are provided at an upper wall portion of the tank. In this case, because the temperature of the upper wall portion of the tank is increased by heat conducted from the heater and heat generated by the switching element, it is required to cool the electric components.

An object of the present invention is to provide a fluid-heating device that is capable of sufficiently cooling electric components.

According to one aspect of the present invention, a fluid-heating device for heating fluid includes: a heater having a heat generating part, the heat generating part being configured to generate heat upon application of current; an electric component configured to control the application of the current to the heater; a tank having an opening portion, the tank being configured to accommodate the heat generating part; a top-plate portion configured to close the opening portion of the tank, the top-plate portion being configured to form a fluid chamber through which the fluid flows; and a first communication port and a second communication port configured to allow the fluid to flow through the fluid chamber, wherein the electric component is provided on an outer side of the fluid chamber along the top-plate portion.

According to the above-mentioned aspect, the heat generated by the electric components is transferred via the top-plate portion to the fluid flowing through the fluid chamber. Therefore, it is possible to sufficiently cool the electric components.

DESCRIPTION OF EMBODIMENTS

Embodiments of the present invention will be described below with reference to the drawings.

First Embodiment

A fluid-heating device 1 according to a first embodiment of the present invention will be described below with reference to FIGS. 1 to 4.

The fluid-heating device 1 is applied to a vehicle air-conditioning device (not shown) mounted on a vehicle such as an EV (Electric Vehicles), an HEV (Hybrid Electric Vehicles), and so forth. The fluid-heating device 1 heats hot water serving as fluid when the vehicle air-conditioning device performs a cabin-heating operation.

An overall configuration of the fluid-heating device 1 will be described first.

Figure 1:
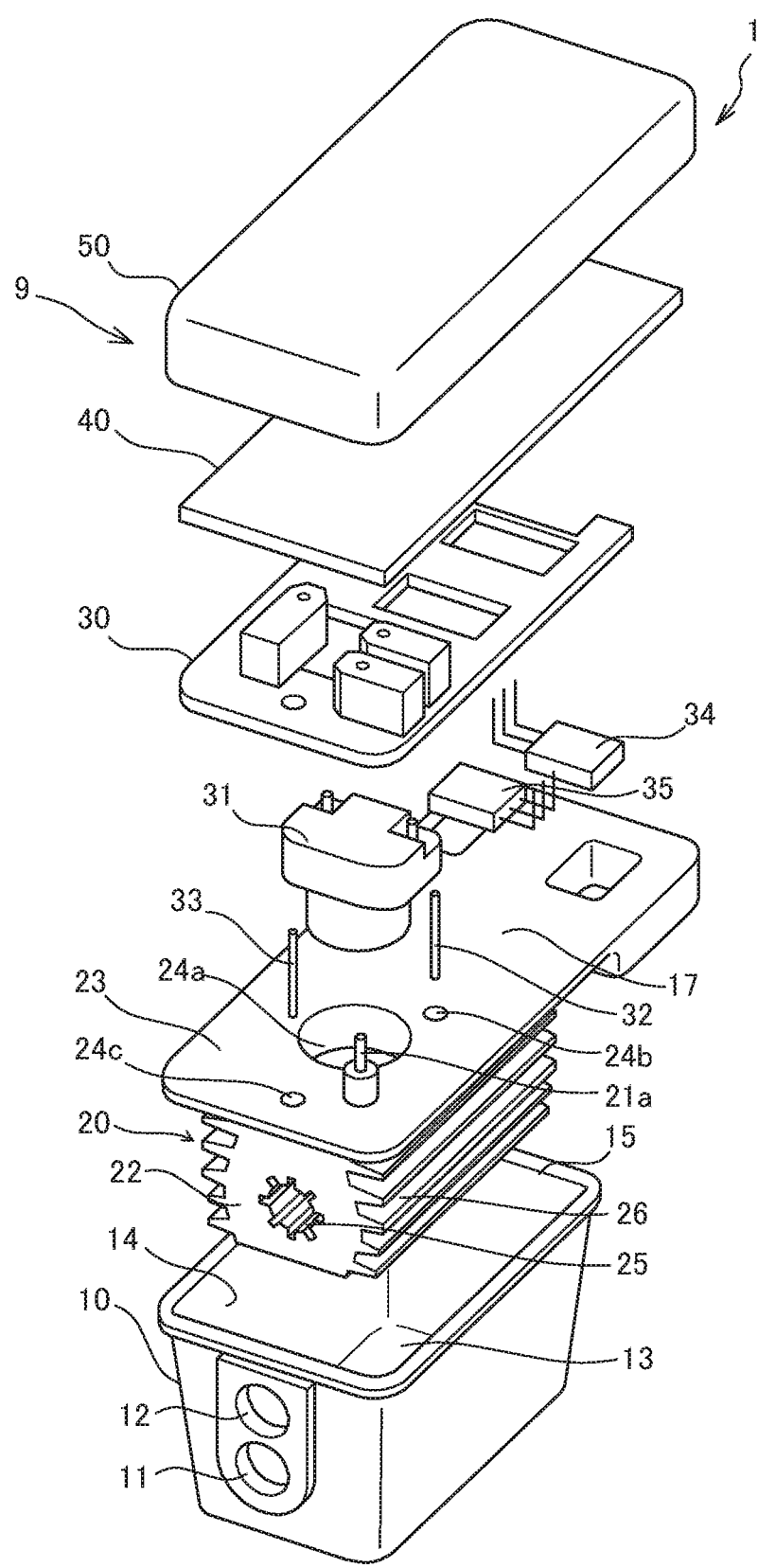
FIG. 1 is an exploded perspective view of a fluid-heating device according to a first embodiment of the present invention.

As shown in FIG. 1, the fluid-heating device 1 includes a tank 10 through which water flows, a heater unit 20 that is accommodated in the tank 10, a bus-bar module 30 that serves as an electric component for supplying electrical power to the heater unit 20, a control substrate 40 that serves as a control unit for controlling operation of the heater unit 20, and a cover 50 that covers the bus-bar module 30 and the control substrate 40.

The tank 10 is formed to have a substantially cuboid shape. The tank 10 has a rectangular bottom surface 13, wall surfaces 14 erected from the bottom surface 13, and an opening portion 15 that opens at end portions of the wall surfaces 14 so as to oppose the bottom surface 13. The tank 10 also has a first communication port 11 (a supply port) through which the hot water is supplied and a second communication port 12 (a discharge port) through which the hot water is discharged. The first communication port 11 and the second communication port 12 have openings that are aligned vertically on the same wall surface 14 of the tank 10. The fluid-heating device 1 is disposed in the vehicle such that the second communication port 12 is positioned above the first communication port 11 when used.

Figure 2:
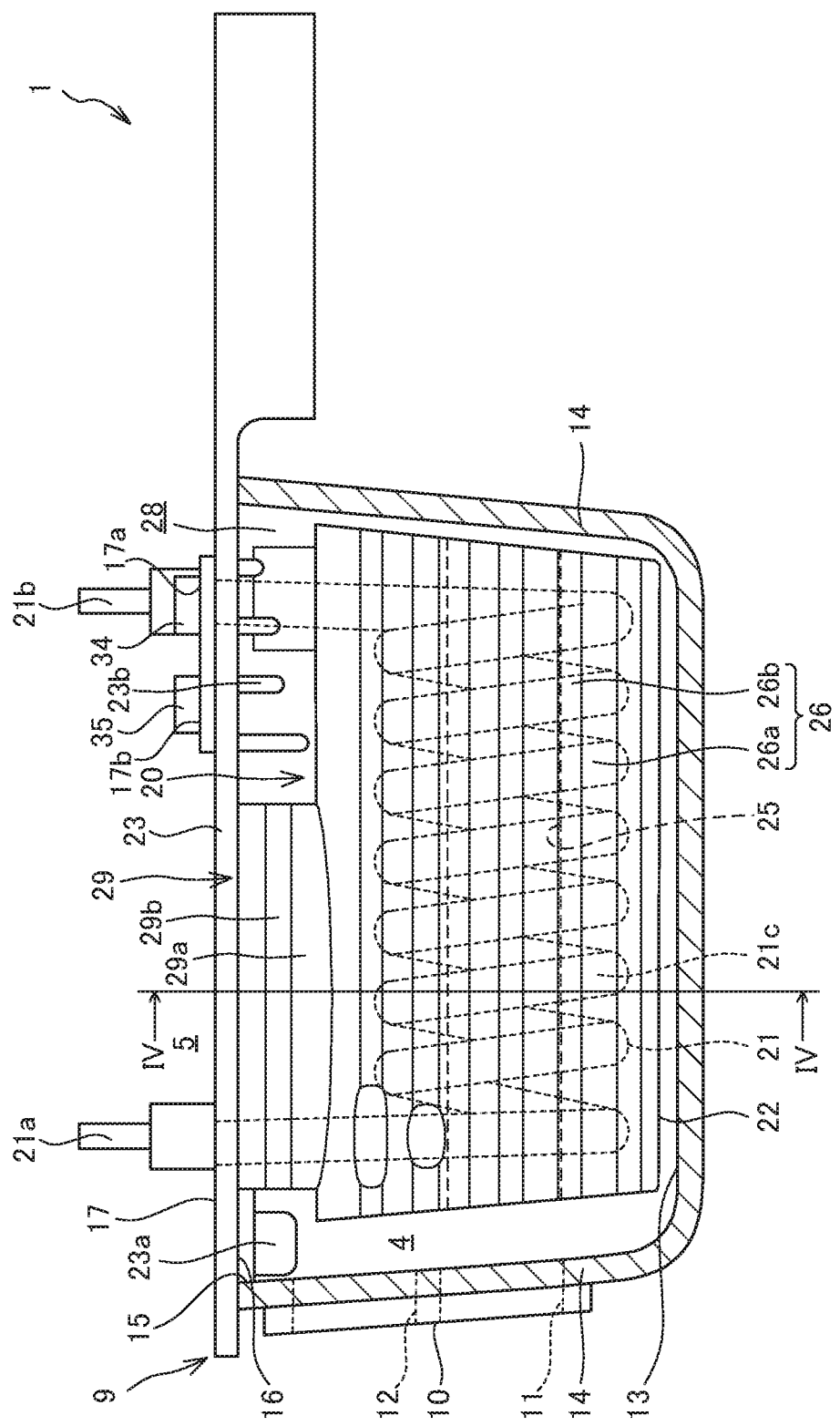
FIG. 2 is a side view of a heater unit and a tank of the fluid-heating device according to the first embodiment and is a diagram in which the tank is viewed in cross section.
Figure 3:
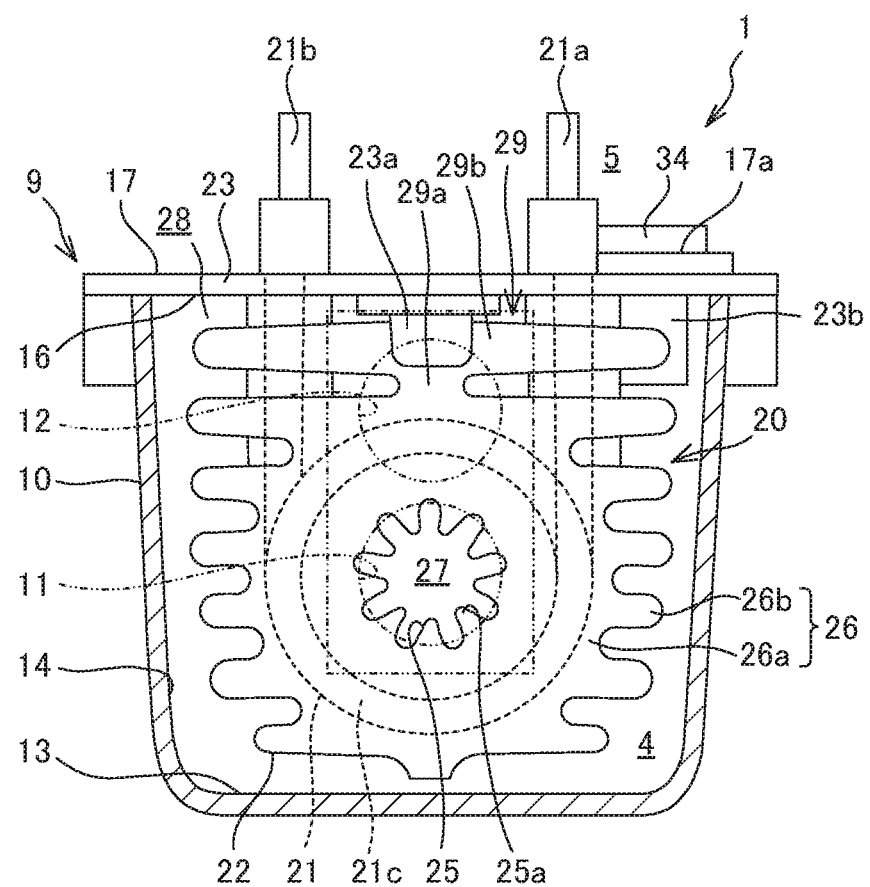
FIG. 3 is a front view of the heater unit and the tank of the fluid-heating device according to the first embodiment and is a diagram in which the tank is viewed in cross section.

As shown in FIGS. 2 and 3, the heater unit 20 has a helical-shaped heater 21 and a heating portion 22 that is formed so as to cover the surrounding of the heater 21. In the heater unit 20, the heating portion 22 is formed by die-cast molding a metal around the heater 21 such that the cast-in heater 21 is inserted therein. The heater unit 20 is integrally molded with a top-plate portion 23 that closes the opening portion 15 of the tank 10 and forms a fluid chamber 4. The tank 10, the heater unit 20, and the cover 50 form a case 9 that forms the fluid chamber 4 and an electric-component chamber 5. In addition, a connecting portion 29 is formed between the heater unit 20 and the top-plate portion 23, and the connecting portion 29 is, together with the heater unit 20, integrally molded with the top-plate portion 23. In other words, the heater unit 20, the connecting portion 29, and the top-plate portion 23 are integrally molded.

The heater 21 has a pair of terminals 21a and 21b to which the electrical power is supplied through the bus-bar module 30 from a power unit (not shown) mounted on the vehicle. The heater 21 has a helical-shaped heat generating part 21c (heat generating body) provided between the pair of terminals 21a and 21b so as to project out into the tank 10. The heater 21 is a sheathed heater or a PTC (Positive Temperature Coefficient) heater that generates heat at the heat generating part 21c by applying current. It is preferable to employ the sheathed heater as the heater 21 in terms of costs. Upon receiving an instruction from the control substrate 40, the heater 21 generates heat and heats the hot water flowing through the tank 10 via the heating portion 22.

The heating portion 22 has a through hole 25 that is formed so as to be smaller than an inner circumference of the heater 21 and that penetrates through the heater 21 along the center axis thereof and an outer-wall portion 26 that is formed so as to be larger than the outer circumference of the heater 21 and that face the wall surfaces 14 (inner wall) of the tank 10. The heating portion 22 is molded of a metal having a lower melting point as compared to the heater 21. In this embodiment, the heater 21 is formed of stainless steel, and the heating portion 22 is formed of aluminum alloy. The heating portion 22 heats the hot water by transferring the heat generated at the heater 21 to the hot water.

The through hole 25 is formed in the heat generating part 21c coiled into the helical-shape. The first communication port 11 of the tank 10 opens on the line extending from the through hole 25. The through hole 25 forms an inner-circumferential flow channel 27 (see FIG. 3) through which the hot water supplied from the first communication port 11 flows.

As shown in FIG. 3, the through hole 25 has a plurality of inner circumferential fins 25a that project towards the inner circumference along the flowing direction of the hot water. With the inner circumferential fins 25a, the heat transfer area of the inner-circumferential flow channel 27 is increased as compared to a case in which the inner circumferential fins 25a are not provided. The plurality of inner circumferential fins 25a are formed over the entire circumference of the through hole 25 at equal angle intervals.

The outer-wall portion 26 forms an outer circumferential flow channel 28 that guides the hot water from the inner-circumferential flow channel 27 to the second communication port 12 between the outer-wall portion 26 and the wall surfaces 14 of the tank 10. The heat transfer area of the outer-wall portion 26 is larger than that of the through hole 25. In addition, the flow channel area of the outer circumferential flow channel 28 is larger than that of the inner-circumferential flow channel 27.

The outer-wall portion 26 has an outer-wall main body 26a formed so as to match with the outer-circumference shape of the heater 21 and a plurality of outer circumferential fins 26b that project towards the outer circumference from the outer-wall main body 26a along the flowing direction of the hot water.

The outer-wall main body 26a is formed so as to cover the outer side of the heat generating part 21c coiled into the helical-shape. Because the outer-wall main body 26a is provided, the heater 21 does not come into direct contact with the hot water.

With the outer circumferential fins 26b, the heat transfer area of the outer circumferential flow channel 28 is increased as compared to a case in which the outer circumferential fins 26b are not provided. The outer circumferential fins 26b are provided so as to extend substantially parallel to the bottom surface 13 of the tank 10 and a fluid chamber wall surface 16 (top surface) of the top-plate portion 23. The outer circumferential fins 26b are formed such that the size thereof becomes larger towards the fluid chamber wall surface 16 relative to the size at a central portion of the height direction of the tank 10. The outer circumferential fins 26b are respectively formed so as to face a pair of opposed wall surfaces 14 of the tank 10 at a predetermined gaps.

As described above, the heater unit 20 has the heating portion 22 that is formed so as to cover the surrounding of the heater 21. The heating portion 22 has the through hole 25 that is formed so as to be smaller than the inner circumference of the heater 21 and the outer-wall portion 26 that is formed so as to be larger than the outer circumference of the heater 21. In the heater unit 20, because the surface area of the heating portion 22 corresponds to the heat transfer area for performing heat exchange with the hot water, the total surface area of the through hole 25 and the outer-wall portion 26 becomes equal to the heat transfer area. Therefore, as compared to a case in which the heater 21 is brought into direct contact with the hot water, it is possible to increase the heat transfer area for performing the heat exchange with the hot water.

As shown in FIG. 2, the top-plate portion 23 has an electric-component-chamber wall surface 17 that forms the electric-component chamber 5 (control chamber) for accommodating the electric components. The top-plate portion 23 is formed so as to be longer than the opening portion 15 of the tank 10 in the axial direction of the heater unit 20. A part of the top-plate portion 23 extending out from the tank 10 is provided with connectors (not shown) for connecting the fluid-heating device 1 to the power unit, a host controller, and so forth (not shown) mounted on the vehicle.

The top-plate portion 23 is welded to an outer circumference edge of the opening portion 15 in a state in which the heater unit 20 is inserted into the tank 10. The top-plate portion 23 forms the fluid chamber wall surface 16 of the tank 10. The fluid chamber wall surface 16 opposes the bottom surface 13 of the tank 10 so as to be substantially in parallel therewith.

As shown in FIG. 1, the top-plate portion 23 is formed with a recessed portion 24a for attaching a bimetal switch 31 serving as a temperature switch, a recessed portion 24b for attaching a heater temperature sensor 32, and a recessed portion 24c for attaching a water temperature sensor 33. As shown in FIG. 2, a pair of IGBTs (Insulated Gate Bipolar Transistor) 34 and 35 serving as a switching element (electric component) are in contact with the top-plate portion 23. The top-plate portion 23 has contact portions 17a and 17b with which the IGBTs 34 and 35 are brought into contact. The top-plate portion 23 is formed with heat releasing fins 23b that project towards the inside of the tank 10 from the fluid chamber wall surface 16 positioned on the opposite side of the contact portions 17a and 17b.

A plurality of heat releasing fins 23b are formed along the flowing direction of the hot water around the heat releasing fins 23b, in other words, the flowing direction of the hot water in the outer circumferential flow channel 28. The plurality of heat releasing fins 23b are formed such that the projecting amount thereof from the top-plate portion 23 is increased along the flowing direction of the hot water. Specifically, the plurality of heat releasing fins 23b are formed such that the projecting amount thereof from the top-plate portion 23 is increased towards the second communication port 12 side. In addition, the heat releasing fins 23b are formed so as not to come into contact with the heating portion 22. Although respective heat releasing fins 23b are provided so as to extend in the direction orthogonal to the flow of the hot water in this embodiment, the respective heat releasing fins 23b may be provided so as to extend in the flowing direction of the hot water.

Figure 4:
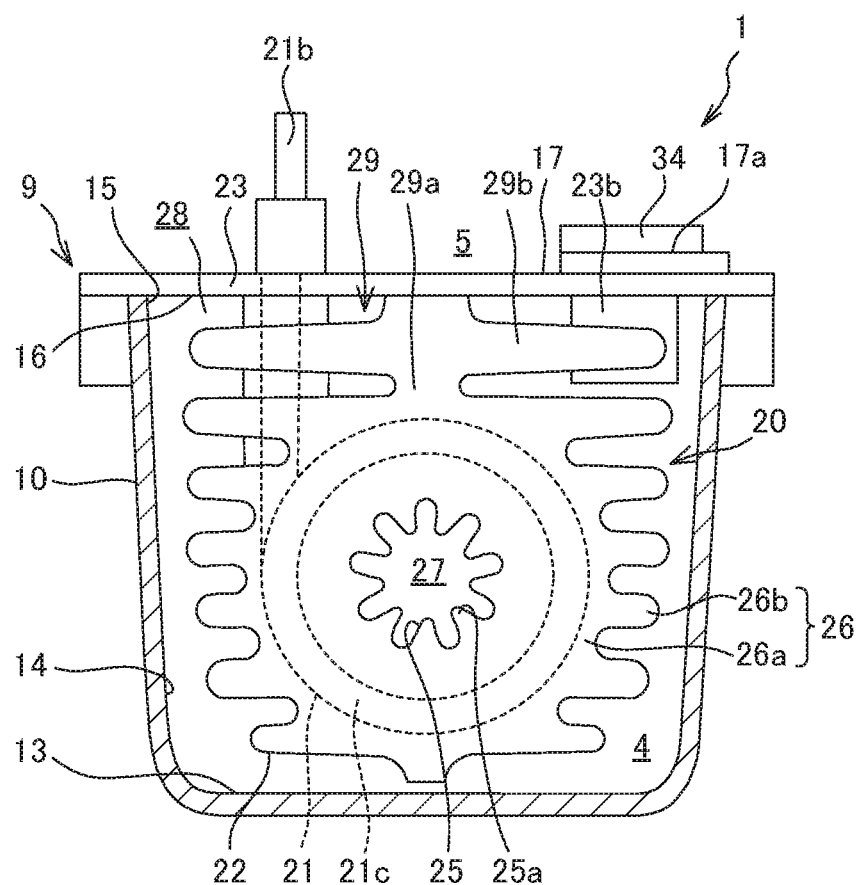
FIG. 4 is a IV-IV sectional view in FIG. 2.

As shown in FIG. 4, the connecting portion 29 is provided between the heating portion 22 of the heater unit 20 and the top-plate portion 23, and as shown in FIG. 2, the connecting portion 29 is provided so as to extend along the axial direction of the heater unit 20. FIG. 4 is a IV-IV sectional view in FIG. 2. The connecting portion 29 has a neck portion 29a that is connected to an upper part of the heating portion 22 and a heat releasing portion 29b that is provided between the neck portion 29a and the top-plate portion 23 so as to connect the neck portion 29a and the top-plate portion 23. The heat releasing portion 29b may not be provided on the connecting portion 29, and only the neck portion 29a may be provided on the connecting portion 29.

As shown in FIGS. 3 and 4, the neck portion 29a is formed such that the width of the neck portion 29a becomes shorter than that of the heater unit 20. By making the width of the neck portion 29a shorter than that of the heating portion 22, heat conduction from the heating portion 22 to the top-plate portion 23 is suppressed.

As shown in FIGS. 3 and 4, the heat releasing portion 29b is formed such that the width of a part of the heat releasing portion 29b becomes longer than that of the neck portion 29a. The heat releasing portion 29b releases the heat conducted from the top-plate portion 23 to the hot water. In addition, the heat releasing portion 29b releases the heat conducted from the neck portion 29a to the hot water. By releasing the heat to the hot water with the heat releasing portion 29b, the heat conduction between the heating portion 22 and the top-plate portion 23 is suppressed.

The IGBTs 34 and 35 are connected to the power unit of the vehicle via the bus-bar module 30. The IGBTs 34 and 35 are connected to the control substrate 40, and performs switching operation in accordance with an instruction signal from the control substrate 40. The IGBTs 34 and 35 control supply of the electrical power to the heater unit 20 by the switching operation. With such a configuration, a temperature of the heater unit 20 is adjusted to a desired temperature, and thereby, a temperature of the hot water discharged from the second communication port 12 is adjusted to a desired temperature.

The IGBTs 34 and 35 generate heat by repeating the switching operation. The highest temperature at which the IGBTs 34 and 35 can operate is higher than the temperature of the hot water flowing in the tank 10. Thus, the heat generated by the IGBTs 34 and 35 is released to the hot water flowing in the tank 10 via the heat releasing fins 23b and the heat releasing portion 29b, and the IGBTs 34 and 35 are cooled.

The bimetal switch 31 detects the temperature of the heater unit 20 and is switched in accordance with the detected temperature. Specifically, when the temperature of the heater unit 20 becomes higher than a first set temperature, the bimetal switch 31 interrupts the supply of the electrical power to the heater unit 20. When the temperature of the heater unit 20 becomes lower than a second set temperature that is lower than the first set temperature, the bimetal switch 31 may be switched again such that the supply of the electrical power to the heater unit 20 is restarted.

The heater temperature sensor 32 detects a temperature of the heater 21 of the heater unit 20. The heater temperature sensor 32 sends an electric signal to the control substrate 40 in accordance with the detected temperature of the heater 21. When the temperature of the heater 21 detected by the heater temperature sensor 32 is higher than the set temperature, the control substrate 40 stops supply of the electrical power to the heater 21.

The water temperature sensor 33 detects the temperature of the hot water in the vicinity of the second communication port 12 of the tank 10. In other words, the water temperature sensor 33 detects the temperature of the hot water to be discharged from the tank 10 after the hot water has been heated. The water temperature sensor 33 is provided in a projected portion 23a (see FIGS. 2 and 3) that projects into the tank 10 from the top-plate portion 23. The water temperature sensor 33 sends an electric signal to the control substrate 40 in accordance with the detected temperature of the hot water. The control substrate 40 controls the supply of the electrical power to the heater 21 such that the temperature of the hot water detected by the water temperature sensor 33 becomes a desired temperature.

As shown in FIG. 1, the bus-bar module 30 is layered on top of the top-plate portion 23. The bus-bar module 30 is formed to have a rectangular shape smaller than the top-plate portion 23. The bus-bar module 30 is a conductive connecting member formed of metal plates capable of sending and supplying the electrical power and the electric signals.

The control substrate 40 is layered on top of the bus-bar module 30. The control substrate 40 is formed to have a rectangular shape smaller than the top-plate portion 23. The control substrate 40 is electrically connected to the bus-bar module 30 and the IGBTs 34 and 35. The control substrate 40 controls the IGBTs 34 and 35 on the basis of the instruction from the host controller.

The cover 50 is provided above the control substrate 40. The cover 50 is formed to have substantially the same outer-circumference shape as that of the top-plate portion 23. The cover 50 is welded to an outer circumference edge of the top-plate portion 23. The cover 50 seals an internal space formed between the cover 50 and the top-plate portion 23.

According to the above-mentioned first embodiment, advantages shown below can be afforded.

The fluid-heating device 1 for heating the hot water (fluid) includes: the heater 21 having the heat generating part 21c that generates heat upon application of current; the electric components, such as the IGBTs 34 and 35, etc., that control the application of the current to the heater 21; the tank 10 that has the opening portion 15 and accommodates the heater 21; the top-plate portion 23 that closes the opening portion 15 of the tank 10 and forms the fluid chamber 4 through which the hot water flows; and the first communication port 11 and the second communication port 12 that allow the hot water to flow through the fluid chamber 4. In this configuration, the electric components, such as the IGBTs 34 and 35, etc., are provided on the outer side (the back side) of the fluid chamber 4 along the top-plate portion 23.

According to the above-described configuration, the heat generated at the electric components, such as the IGBTs 34 and 35, etc., is transferred via the top-plate portion 23 to the hot water flowing through the fluid chamber 4. Thus, it is possible to sufficiently cool the electric components, such as the IGBTs 34 and 35, etc.

In addition, in this configuration: the first communication port 11 and the second communication port 12 are arranged on the same side (on the left hand side in FIG. 2) with respect to the heater 21; the first communication port 11 is arranged so as to face the heat generating part 21c of the heater 21; and the second communication port 12 is arranged between the first communication port 11 and the top-plate portion 23 when viewed from the extending direction of the heat generating part 21c of the heater 21.

According to the above-described configuration, in the fluid chamber 4, the hot water that has been guided through the first communication port 11 flows through and turns around the surrounding (the inside and outside) of the heat generating part 21c of the heater 21, and thereby, the heat of the heater 21 is transferred to the hot water. In the fluid chamber 4, the hot water to be guided through the second communication port 12 flows along the top-plate portion 23, and thereby, the heat generated at the electric components, such as the IGBTs 34 and 35, etc., is efficiently transferred to the hot water via the top-plate portion 23. Thus, it is possible to sufficiently cool the electric components, such as the IGBTs 34 and 35, etc.

In the above-mentioned embodiment, the hot water is supplied from the outside of the tank 10 to the fluid chamber 4 through the first communication port 11, and the hot water is discharged from the fluid chamber 4 to the outside of the tank 10 through the second communication port 12. The configuration is not limited thereto, and the hot water may be supplied from the outside of the tank 10 to the fluid chamber 4 through the second communication port 12, and the hot water may be discharged from the fluid chamber 4 to the outside of the tank 10 through the first communication port 11.

In the above-mentioned embodiment, the heater 21 is provided inside the tubular heating portion 22. The configuration is not limited thereto, and the heating portion 22 may be omitted, and the heater 21 may be configured so as to directly heat the hot water.

In addition, in this configuration, the fluid-heating device 1 further includes the heating portion 22 that is formed so as to cover the surrounding of the heater 21 and to heat the hot water, and the heating portion 22 is integrally formed with the top-plate portion 23.

According to the above-described configuration, in the fluid chamber 4, the hot water that has been guided through the first communication port 11 flows around the surrounding of the heating portion 22, and thereby, the heat of the heater 21 is transferred to the hot water via the heating portion 22. The surface area of the heating portion 22 corresponds to the heat transfer area for performing the heat exchange with the hot water. Therefore, as compared to a case in which the heater 21 is brought into direct contact with the hot water, it is possible to increase the heat transfer area for performing the heat exchange with the hot water. Thus, the heat transfer efficiency for heating the hot water by the heater 21 is improved.

The heat generated by the heater 21 is also conducted to the top-plate portion 23 via the heating portion 22. In a protruded portion 259, the hot water to be guided through the second communication port 12 flows along the top-plate portion 23, and thereby, the heat of the top-plate portion 23 is efficiently transferred to the hot water. With such a configuration, it is possible to suppress increase in temperature of the top-plate portion 23, the electric components such as the IGBTs 34 and 35 and the water temperature sensor 33, and so forth.

Thus, with the fluid-heating device 1, it is possible to achieve both the improvement of the heat transfer efficiency for heating the hot water by the heater 21 and improvement of heat resistance of the electric components such as the IGBTs 34 and 35, the water temperature sensor 33, and so forth.

With the fluid-heating device 1, because the heating portion 22 and the top-plate portion 23 are formed integrally, assembly work thereof becomes easy.

In addition, the fluid-heating device 1 includes the neck portion 29a having shorter width than that of the heating portion 22 on the connecting portion 29 connecting the heating portion 22 and the top-plate portion 23.

With such a configuration, with the fluid-heating device 1, it is possible to suppress the heat conduction from the heating portion 22 to the top-plate portion 23, to suppress the increase in the temperature of the top-plate portion 23, and to suppress the increase in the temperature of the IGBTs 34 and 35 that are in contact with the top-plate portion 23. In addition, because the heat conduction from the heating portion 22 to the top-plate portion 23 can be suppressed, it is possible to suppress the heat transfer from the heating portion 22 to components other than the hot water and to suppress decrease in the temperature of the heating portion 22 due to the heat transfer to components other than the hot water. Therefore, it is possible to suppress the heat generation by the heater 21, in other words, amount of current applied to the heater 21, and to suppress consumption of the electrical power by the heater 21.

In addition, the fluid-heating device 1 includes the heat releasing portion 29b having a width longer than that of the neck portion 29a between the neck portion 29a and the top-plate portion 23.

With such a configuration, with the fluid-heating device 1, it is possible to increase the heat transfer area of the heat releasing portion 29b with the hot water and to increase the releasing amount of the heat that has been conducted from the heating portion 22 via the neck portion 29a. Therefore, it is possible to suppress the heat conduction from the heating portion 22 to the top-plate portion 23, to suppress the increase in the temperature of the top-plate portion 23, and to suppress the increase in the temperature of the IGBTs 34 and 35 in contact with the top-plate portion 23. In addition, it is possible to increase the releasing amount of the heat that has been conducted from the top-plate portion 23 to the heat releasing portion 29b, to suppress the increase in the temperature of the top-plate portion 23, and to suppress the increase in the temperature of the IGBTs 34 and 35 in contact with the top-plate portion 23.

In addition, the top-plate portion 23 includes the heat releasing fins 23b that project out into the fluid chamber 4 from the fluid chamber wall surface 16 on the back side of the contact portions 17a and 17b with which the electric components, such as the IGBTs 34 and 35, etc., are brought into contact.

With such a configuration, because the heat generated by the IGBTs 34 and 35, etc. can be released to the hot water via the heat releasing fins 23b, a mechanism for cooling the IGBTs 34 and 35 needs not be provided separately, and it is possible to reduce the size of the fluid-heating device 1.

In addition, the heat releasing fins 23b are provided so as not to be in contact with the heating portion 22.

With such a configuration, with the fluid-heating device 1, it is possible to prevent the heat generated at the heater 21 from being conducted from the heating portion 22 to the heat releasing fins 23b, and it is possible to prevent its performance for cooling the IGBTs 34 and 35 from being deteriorated.

In addition, the heat releasing fins 23b are provided such that the projecting amount thereof from the fluid chamber wall surface 16 is increased along the flowing direction of the hot water around the heat releasing fins 23b.

With such a configuration, with the fluid-heating device 1, even on the downstream side in the flowing direction of the hot water in the outer circumferential flow channel 28, it is possible to increase the amount of heat released from the heat releasing fins 23b to the hot water and to further cool the IGBTs 34 and 35.

Second Embodiment

Next, a second embodiment of the present invention will be described with reference to FIGS. 5 to 8. In the following, differences from the above-described first embodiment will be mainly described, and components that are the same as those in the fluid-heating device 1 according to the above-described first embodiment are assigned the same reference numerals and descriptions thereof will be omitted.

A tank 110 of a fluid-heating device 100 according to the second embodiment has a second wall surface 114b that is inclined with respect to the center line O of a first communication port 111. In this configuration, the hot water that has been supplied from the first communication port 111 to a fluid chamber 104 is smoothly guided towards a top-plate portion 123 (a fluid chamber wall surface 116) by the second wall surface 114b.

Figure 5:
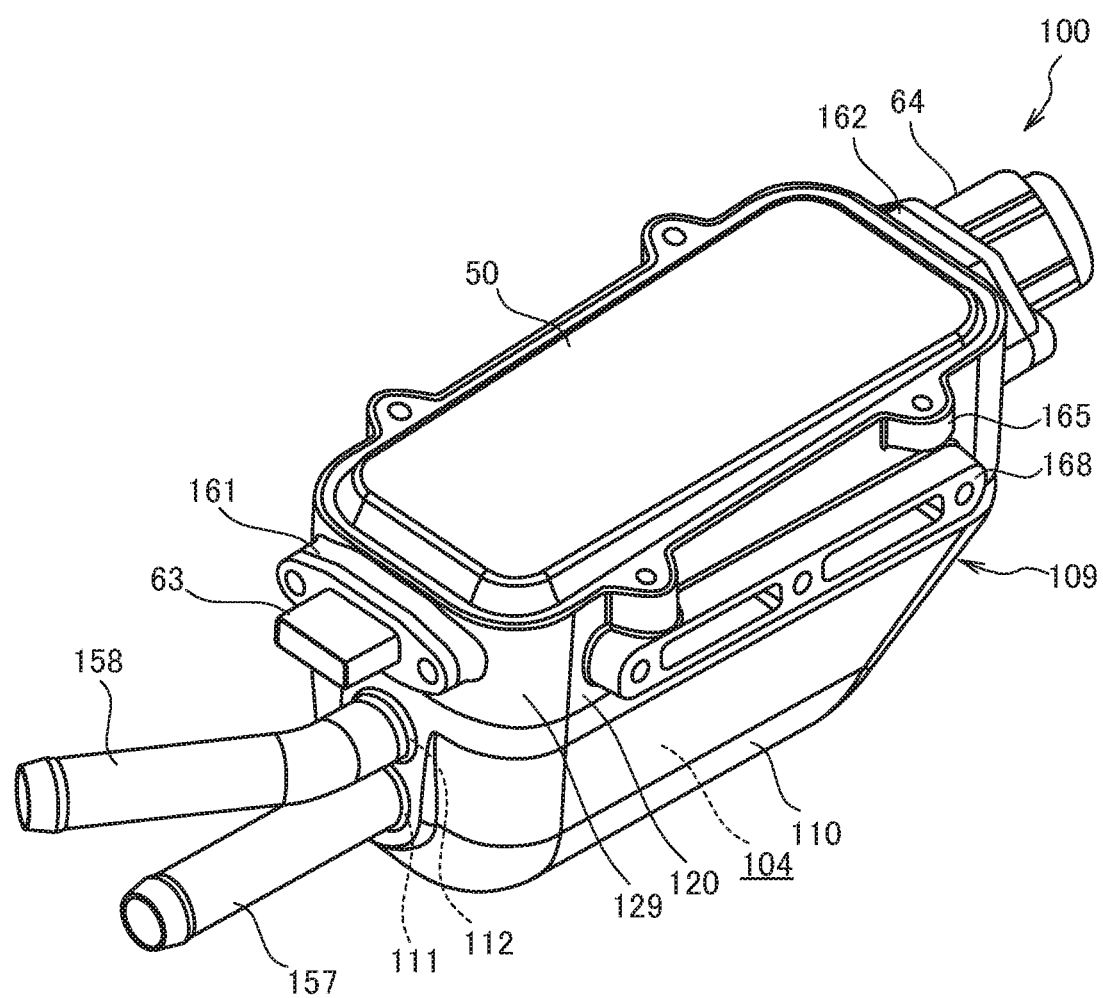
FIG. 5 is a perspective view of the fluid-heating device according to a second embodiment of the present invention.
Figure 6:
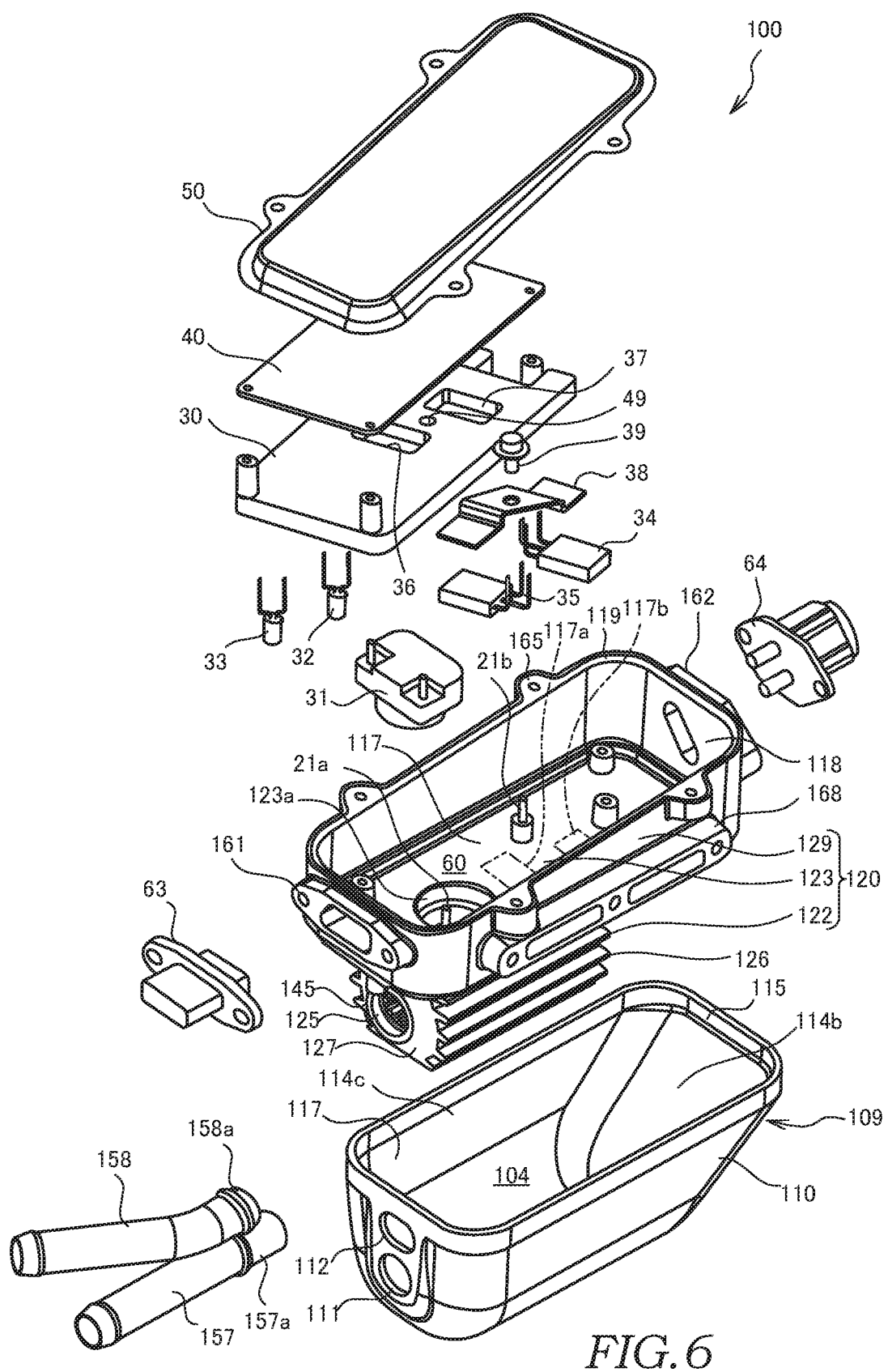
FIG. 6 is an exploded perspective view of the fluid-heating device according to the second embodiment.

As shown in FIGS. 5 and 6, the fluid-heating device 100 includes the tank 110 that forms the fluid chamber 104 through which the water flows, a heater unit 120 that is accommodated in the tank 110, the bus-bar module 30 that connects various electric components, the control substrate 40 that serves as the control unit for controlling operation of the heater unit 120, and the cover 50 that covers the bus-bar module 30 and the control substrate 40.

The tank 110 is formed to have a boat shape. The tank 110 has a bottom surface 113, four curved wall surfaces 114a, 114b, 114c, and 114d (see FIGS. 7 and 8) erected from the bottom surface 113, and an opening portion 115 that opens at end portions of the wall surfaces 114a, 114b, 114c, and 114d so as to oppose the bottom surface 113. The wall surfaces 114a, 114b, 114c, and 114d are respectively formed so as to face upwards by being inclined with respect to the vertical line (the reference line).

On the first wall surface 114a of the tank 110, the first communication port 111 (the supply port) and a second communication port 112 (the discharge port) open so as to be aligned vertically. The first communication port 111 supplies the hot water to the fluid chamber 104 from the outside, and the second communication port 112 discharges the hot water to the outside from the fluid chamber 104. The fluid-heating device 100 is mounted on the vehicle such that the second communication port 112 is positioned above the first communication port 111. The configuration is not limited thereto, and it may also be possible to employ a configuration in which the fluid-heating device 100 is mounted on the vehicle such that the second communication port 112 and the first communication port 111 are positioned side by side in the horizontal direction.

Figure 7:
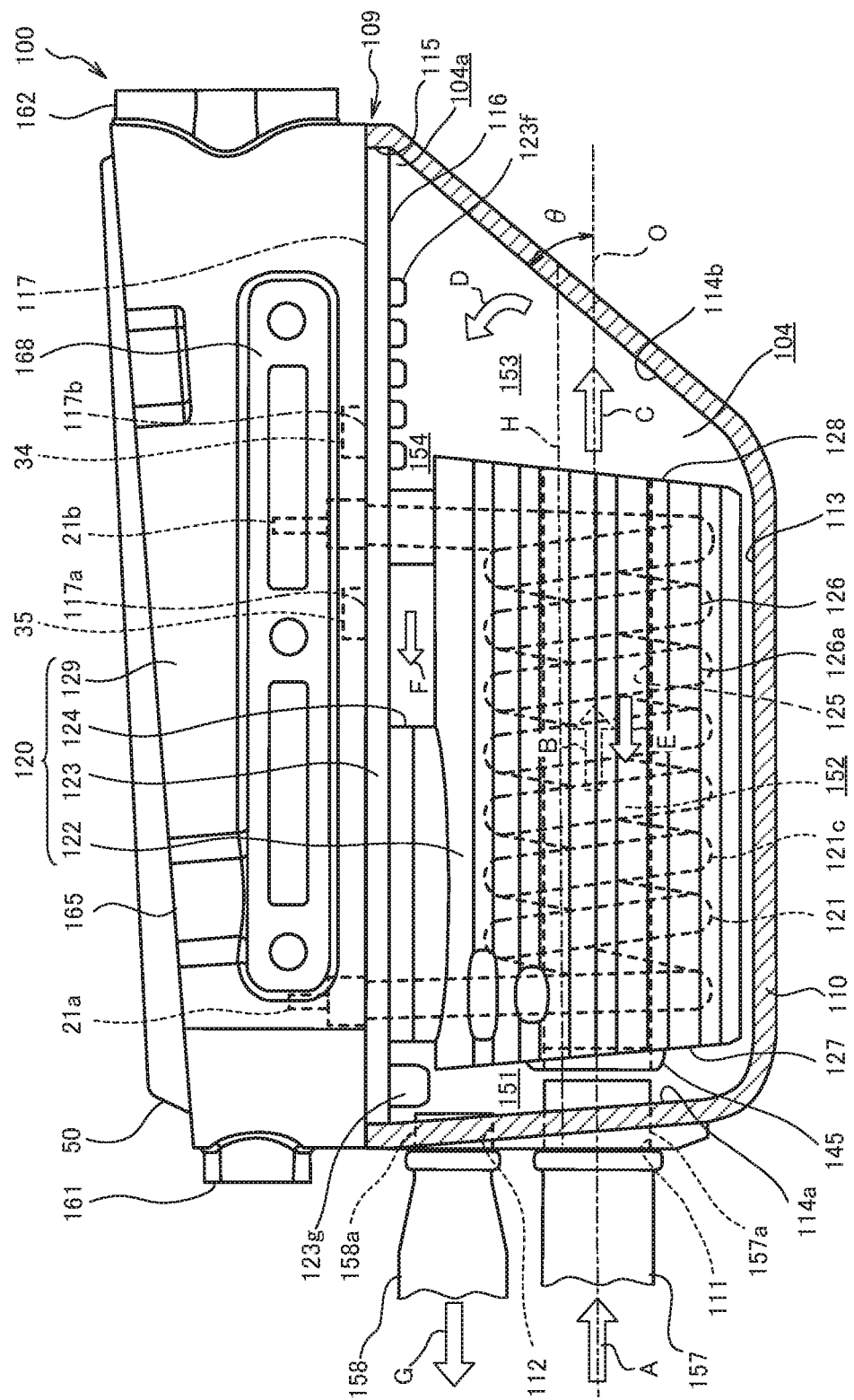
FIG. 7 is a side view of the fluid-heating device according to the second embodiment and is a diagram in which the tank is viewed in cross section.

The second wall surface 114b of the tank 110 is formed so as to oppose the first wall surface 114a and so as to be inclined with respect to the center line O of the first communication port 111 at an angle of θ (see FIG. 7). The inclined angle of the second wall surface 114b with respect to the vertical line (the reference line) is set so as to be larger than those of other wall surfaces 114a, 114c, and 114d.

A proximal portion 157a of a supply pipe 157 is inserted into the first communication port 111. The supply pipe 157 projecting out from the tank 110 is connected to a piping (not shown) for guiding the hot water to be supplied.

A proximal portion 158a of a discharge pipe 158 is inserted into the second communication port 112. The discharge pipe 158 projecting out from the tank 110 is connected to a piping (not shown) for guiding the hot water to be discharged.

Figure 8:
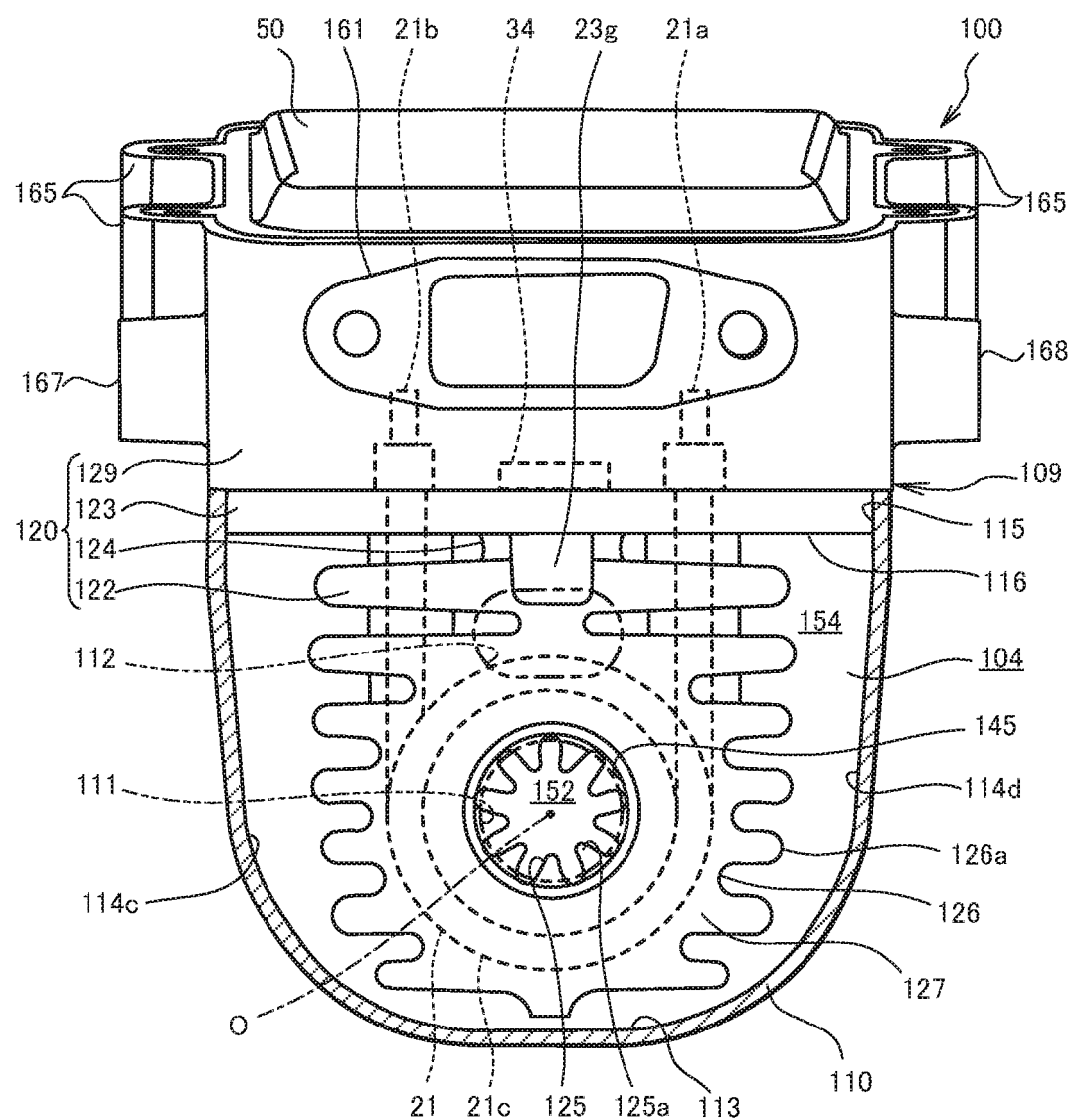
FIG. 8 is a front view of the fluid-heating device according to the second embodiment and is a diagram in which the tank is viewed in cross section.

As shown in FIGS. 7 and 8, the heater unit 120 has the electric heater (hereinafter, simply referred to as "heater") 21 that generates heat, a heating portion 122 that is formed so as to cover the surrounding of the heater 21, the top-plate portion 123 (lid) that closes the opening portion 115 of the tank 110, and a connecting portion 124 that connects the heating portion 122 and the top-plate portion 123. In the heater unit 120, the heating portion 122, the connecting portion 124, and the top-plate portion 123 are integrally molded.

The heater 21 has the helical-shaped cast-in heat generating part 21c in the heating portion 122 and the pair of terminals 21a and 21b that project upwards from the top-plate portion 123. The heat generating part 21c may not have a helical-shape, and for example, the heat generating part 21c may be formed so as to extend back and forth in the heating portion 122.

The heating portion 122 has a through hole 125 that is formed so as to have a diameter smaller than an inner circumference of the heat generating part 21c and that penetrates through the heat generating part 21c along the center thereof, an outer-wall portion 126 that is formed so as to have a larger diameter than the outer circumference of the heat generating part 21c and that faces the bottom surface 113 of the tank 110 and the third wall surface 114c and the fourth wall surface 114d, a first-end wall portion 127 that faces the first wall surface 114a, and a second wall portion 128 that faces the second wall surface 114b.

The through hole 125 is formed in the heat generating part 21c coiled into the helical-shape. The first communication port 111 of the tank 110 opens on the center line O of the through hole 125. The through hole 125 forms an inner-circumferential flow channel 252 (see FIG. 8) through which the hot water supplied from the first communication port 111 flows.

The outer-wall portion 126 forms an outer circumferential flow channel 154 between the outer-wall portion 126 and the bottom surface 113, the third wall surface 114c, the fourth wall surface 114d of the tank 110, and the fluid chamber wall surface 116 of the top-plate portion 123. The outer circumferential flow channel 154 communicates with an inner-circumferential flow channel 152 and guides the hot water that has flowed from the inner-circumferential flow channel 152 to the second communication port 112. The heat transfer area of the outer-wall portion 126 is larger than that of the through hole 125. In addition, the flow channel area of the outer circumferential flow channel 154 is larger than that of the inner-circumferential flow channel 152.

The first-end wall portion 127 opposes the first wall surface 114a so as to form a gap and forms a first-end flow channel 151 between the first-end wall portion 127 and the first wall surface 114a. The first-end flow channel 151 communicates with the first communication port 111, the second communication port 112, the inner-circumferential flow channel 152, and the outer circumferential flow channel 154 and allows the hot water to flow therethrough.

The first-end wall portion 127 of the heating portion 122 is formed with an annular inlet portion 145 at which the through hole 125 opens. The proximal portion 157a of the supply pipe 157 projects out into the tank 110 from the first wall surface 114a and is arranged at an opening portion for the inlet portion 145 (the first-end wall portion 127) of the through hole 125 so as to form the gap therewith. The hot water supplied from the supply pipe 157 is guided to the inner-circumferential flow channel 152 via the first-end flow channel 151.

The configuration is not limited to that described above, and it may also be possible to employ a configuration in which the proximal portion 157a of the supply pipe 157 is inserted into the inlet portion 145, and the supply pipe 157 is connected to the through hole 125. In this case, all of the hot water supplied from the supply pipe 157 is guided to the inner-circumferential flow channel 152.

The second wall portion 128 of the heating portion 122 opposes the second wall surface 114b so as to form the gap and forms a second-end flow channel 153 between second wall portion 128 and the second wall surface 114b. The second-end flow channel 153 communicates with the inner-circumferential flow channel 252 and the outer circumferential flow channel 154 and allows the hot water to flow therethrough.

The fluid chamber 104 formed in the tank 110 is formed by the first-end flow channel 151, the inner-circumferential flow channel 152, the outer circumferential flow channel 154, and the second-end flow channel 153. As shown in FIG. 7, the first communication port 111 is arranged such that the center line O is positioned below the center line H of the fluid chamber 104.

The heater unit 120 is welded to an outer circumference edge of the opening portion 115 in a state in which the heating portion 122 is arranged in the tank 110 and the top-plate portion 123 is fit into the opening portion 115.

The top-plate portion 123 has the fluid chamber wall surface 116 (heat-releasing wall surface) that faces the outer circumferential flow channel 154. The fluid chamber wall surface 116 extends substantially in parallel with the center line O. The fluid chamber wall surface 116 opposes the outer-wall surface 126 of the heating portion 122 so as to form the gap, and thereby, the fluid chamber wall surface 116 forms a part of the outer circumferential flow channel 154 between fluid chamber wall surface 116 and the outer-wall portion 126. The fluid chamber wall surface 116 is formed so as to face the first-end flow channel 151, the outer circumferential flow channel 154, and the second-end flow channel 153.

The tank 110 and the top-plate portion 123 form a case 109. The case 109 accommodates the heating portion 122 (the heater 21) and forms the fluid chamber 104 (a heating flow channel) through which the hot water flows between case 109 and the heating portion 122.

As shown in FIGS. 6 and 8, a box-shaped electric-component-chamber wall portion 129 (housing) is formed above the top-plate portion 123 so as to open upwards.

On both side portions of the electric-component-chamber wall portion 129, a pair of mounting seats 167 and 168 are formed. The fluid-heating device 100 is mounted to the vehicle via brackets (not shown) that are respectively fastened to the mounting seats 167 and 168.

The electric-component-chamber wall portion 129 has an electric-component-chamber wall surface 117 (bottom wall surface) that is positioned on the back side of the fluid chamber wall surface 116, a side-wall surface 118 erected from the electric-component-chamber wall surface 117, and an opening portion 119 that opens at an end portion of the side-wall surface 118.

The opening portion 119 of the electric-component-chamber wall portion 129 is closed by the cover 50. An electric-component chamber 160 (control chamber) is formed between the electric-component-chamber wall portion 129 and the cover 50. A plurality of boss portions 165 are formed on both side portions of the electric-component-chamber wall portion 129. The cover 50 is fastened to the electric-component-chamber wall portion 129 by bolts (not shown) that are screwed into the boss portions 165.

The bus-bar module 30, the control substrate 40, and so forth are accommodated in the electric-component chamber 160. On both ends of the electric-component-chamber wall portion 129, mounting seats 161 and 162 are formed, respectively. The mounting seat 161 is attached with a connector 63 to which a signal line (not shown) for guiding electric signals is connected. The mounting seat 162 is attached with a connector 64 to which the electrical power supply line (not shown) for supplying the electrical power is connected.

The electric-component-chamber wall surface 117 has contact portions 117a and 117b with which the pair of IGBTs 34 and 35 are brought into contact. Receiving holes 36 and 37 for accommodating the IGBTs 34 and 35 are formed on the bus-bar module 30. The IGBTs 34 and 35 are brought into contact with the electric-component-chamber wall surface 117 and are attached to the electric-component-chamber wall portion 129 via a plate 38. The plate 38 is fastened to the top-plate portion 123 at its central portion by a bolt 39, and both end portions thereof are used to press the IGBTs 34 and 35 against the electric-component-chamber wall surface 117. The bolt 39 penetrates through a hole 49 of the bus-bar module 30 and is screwed into a screw hole (not shown) of the top-plate portion 123.

As shown in FIG. 6, the top-plate portion 123 is formed with a recessed portion 123a for attaching the bimetal switch 31 serving as the temperature switch, a recessed portion (not shown) for attaching the heater temperature sensor 32, and a recessed portion (not shown) for attaching the water temperature sensor 33.

The water temperature sensor 33 is provided in a projected portion 123g (see FIGS. 7 and 8) that projects out from the top-plate portion 123 to the fluid chamber 104.

The top-plate portion 123 is formed with heat releasing fins 123f that project out towards the fluid chamber 104 from a position of the fluid chamber wall surface 116 on the back side of a part with which the IGBT 34 is brought into contact.

A plurality of the heat releasing fins 123f are formed so as to face the flowing direction of the hot water in the outer circumferential flow channel 154. The heat releasing fins 123f are formed so as to face the second-end flow channel 153 and the outer circumferential flow channel 154.

The heat releasing fins 123f are respectively formed so as to extend in the direction substantially perpendicular to the center line O and aligned in the center line O direction so as to be separated by predetermined gaps. Each of the heat releasing fins 123f is formed so as to have a predetermined projecting amount (height) from the fluid chamber wall surface 116.

The fluid chamber wall surface 116 and the second wall surface 114b are inclined to each other and form a tapered tip-end portion 104a of the fluid chamber 104 (the second-end flow channel 153) between the fluid chamber wall surface 116 and the second wall surface 114b.

Next, action of the fluid-heating device 100 will be described.

The hot water supplied through the supply pipe 157 as shown by an arrow A in FIG. 7 is guided to the inner-circumferential flow channel 152 through the first-end flow channel 151 of the fluid chamber 104 and passes through the inner-circumferential flow channel 152 as shown by an arrow B. In the inner-circumferential flow channel 152, the hot water is heated by the heat exchange with an inner circumference of the through hole 125 on which inner circumferential fins 125a are formed. The flow of the hot water is rectified by the inner circumferential fins 125a.

The hot water that has passed the inner-circumferential flow channel 152 flows out to the second-end flow channel 153 as shown by an arrow C, changes the flowing direction along the second wall surface 114b, and is guided to the outer circumferential flow channel 154 around the heating portion 122. Because the second wall surface 114b is inclined so as to face the fluid chamber wall surface 116, a force of the flow of the hot water turning at the second-end flow channel 153 and directed towards the fluid chamber wall surface 116 as shown by an arrow D is increased. With such a configuration, the flow speed of the hot water flowing along the fluid chamber wall surface 116 in the outer circumferential flow channel 154 as shown by an arrow F becomes higher than the flow speed of the hot water flowing along outer circumferential fins 126a as shown by an arrow E.

The hot water flowing along the fluid chamber wall surface 116 in the second-end flow channel 153 and the outer circumferential flow channel 154 is heated by the heat exchange with the fluid chamber wall surface 116 and the respective heat releasing fins 123f.

The hot water flowing around the heating portion 122 in the outer circumferential flow channel 154 as shown by the arrow E is heated by the heat exchange with the outer-wall portion 126 and the outer circumferential fins 126a. The flow of the hot water is rectified by the outer circumferential fins 126a.

As shown by the arrow G, the hot water that has flowed through the outer circumferential flow channel 154 is discharged from the discharge pipe 158 of the second communication port 112 through the first-end flow channel 151.

According to the above-mentioned second embodiment, advantages shown below can be afforded.

The tank 110 of the fluid-heating device 100 has the first wall surface 114a at which the first communication port 111 and the second communication port 112 open and the second wall surface 114b that oppose the first wall surface 114a with the heat generating part 21c located therebetween. In this configuration, the second wall surface 114b is inclined with respect to the center line O of the first communication port 111 such that the hot water that has supplied to the fluid chamber 104 from the first communication port 111 is guided to the top-plate portion 123 (the fluid chamber wall surface 116).

According to the above-described configuration, the hot water flows into the fluid chamber 104 from the first communication port 111, turns around in the fluid chamber 104 along the second wall surface 114b, and flows out from the second communication port 112. As shown by the arrow D in FIG. 7, because the hot water turning around in the fluid chamber 104 along the second wall surface 114b is guided to the fluid chamber wall surface 116 along the second wall surface 114b inclined so as to face the fluid chamber wall surface 116, the flow speed of the hot water flowing along the fluid chamber wall surface 116 is increased. With such a configuration, the release of the heat of the IGBTs 34 and 35 from the fluid chamber wall surface 116 to the hot water flowing the fluid chamber 104 is promoted. Thus, the IGBTs 34 and 35 are cooled sufficiently.

The inclined angle θ of the second wall surface 114b with respect to the center line O is set arbitrarily. The flow speed of the hot water flowing along the fluid chamber wall surface 116 in the fluid chamber 104 is adjusted in accordance with the angle.

In addition, in this configuration, the second communication port 112 opens next to the first communication port 111 and is arranged at a position closer to the fluid chamber wall surface 116 relative to the first communication port 111.

According to the above-described configuration, because the second communication port 112 is closer to the fluid chamber wall surface 116 relative to the first communication port 111, the flow speed of the hot water directed to the second communication port 112 in the fluid chamber 104 (the outer circumferential flow channel 154) is increased in a region along the fluid chamber wall surface 116. Thus, the IGBTs 34 and 35 are cooled sufficiently.

In addition, in this configuration, the first communication port 111 is arranged such that the center line O thereof is positioned farther away from the top-plate portion 123 (the fluid chamber wall surface 116) relative to the center (the center line H) of the case 109.

According to the above-described configuration, in the fluid chamber 104, because the flow speed of the hot water flowing in from the first communication port 111 is increased in a lower region farther away from the fluid chamber wall surface 116, the flow speed of the hot water directed to the second communication port 112 is increased in a upper region along the fluid chamber wall surface 116. Thus, the IGBTs 34 and 35 are cooled sufficiently.

In addition, in this configuration, the second wall surface 114b is inclined with respect to the top-plate portion 123 (the fluid chamber wall surface 116), thereby forming the tip-end portion 104a of the fluid chamber 104 between the second wall surface 114b and the top-plate portion 123.

According to the above-described configuration, because the tapered tip-end portion 104a of the fluid chamber 104 is formed between the fluid chamber wall surface 116 of the top-plate portion 123 and the second wall surface 114b that are inclined to each other, a large surface area of the fluid chamber wall surface 116 facing the fluid chamber 104 (the second-end flow channel 153) is ensured. Thus, the IGBTs 34 and 35 are cooled sufficiently.

In addition, in this configuration, the case 109 has the heat releasing fins 123f that project out from the fluid chamber wall surface 116 to the fluid chamber 104.

According to the above-described configuration, the heat generated by the IGBTs 34 and 35 is released to the hot water via the heat releasing fins 123f. With such a configuration, the cooling of the IGBTs 34 and 35 via the case 109 is promoted.

In addition, in this configuration, the heat releasing fins 123f are provided so as to extend in the direction substantially perpendicular to the center line O of the first communication port 111.

According to the above-described configuration, as shown by the arrow D in FIG. 7, the flow of the hot water turning at the second-end flow channel 153 hits the heat releasing fins 123f, and thereby, the release of the heat generated by the IGBTs 34 and 35 to the hot water via the heat releasing fins 123f is promoted.

In addition, the respective heat releasing fins 123f are formed so as to have the same projecting amount from the fluid chamber wall surface 116. The configuration is not limited thereto, and the respective heat releasing fins 123f may be formed such that the projecting amount from the fluid chamber wall surface 116 is increased successively from the second wall surface 114b towards the first wall surface 114a. In this case, because the projecting amount of the respective heat releasing fins 123f from the fluid chamber wall surface 116 is increased along the flowing direction of the hot water in the outer circumferential flow channel 154, the release of heat from the heat releasing fins 123f to the hot water is sufficiently ensured even at the downstream side in the flowing direction of the hot water, and the cooling of the IGBTs 34 and 35 is promoted.

The configuration is not limited to that described above, and it may also be possible to employ a configuration in which the heat releasing fins 123f are provided so as to extend in the direction substantially parallel to the center line O of the first communication port 111. In this case, it is possible to reduce a resistance imparted to the flow of the hot water by the heat releasing fins 123f in the second-end flow channel 153 and the outer circumferential flow channel 154.

In addition, the tubular heating portion 122 that is heated by the heater 21 is accommodated in the case 109. In this configuration, the heating portion 122 has the through hole 125 and the outer-wall portion 126. The through hole 125 forms the inner-circumferential flow channel 252 through which the hot water that has been supplied from the first communication port 111 flows, and the outer-wall portion 126 forms the outer circumferential flow channel 154 through which the hot water that is directed from the through hole 125 to the second communication port 112 flows.

In addition, in this configuration, the connecting portion 124 is arranged between the second communication port 112 and parts (the heat releasing fins 123f) of the fluid chamber wall surface 116 positioned on the back side of the contact portions 117a and 117b.

According to the above-described configuration, because the hot water before passing the surrounding of the connecting portion 124 in the outer circumferential flow channel 154 flows smoothly along the parts positioned on the back side of the contact portions 117a and 117b in the fluid chamber wall surface 116, the flow speed of the hot water flowing along the fluid chamber wall surface 116 is increased. With such a configuration, the release of the heat of the IGBTs 34 and 35 from the fluid chamber wall surface 116 to the hot water flowing in the fluid chamber 104 is promoted. Thus, the IGBTs 34 and 35 are cooled sufficiently.

In the above-mentioned embodiment, as a guide portion that directs the flow of the hot water towards the fluid chamber wall surface 116, the second wall surface 114b is formed to have a smooth plane shape that extends without any steps. The configuration is not limited thereto, and it may also be possible to employ a configuration in which a rib is formed as a guide portion so as to projects out from the second wall surface 114b, and the flow of the hot water is directed by the rib towards the fluid chamber wall surface 116.

In the above-mentioned embodiment, the hot water that has been supplied from the first communication port 111 is discharged from the second communication port 112 by flowing the outer circumferential flow channel 154 after the inner-circumferential flow channel 152. The configuration is not limited thereto, and the hot water that has been supplied from the first communication port 111 may be discharged from the second communication port 112 by flowing the inner-circumferential flow channel 152 after the outer circumferential flow channel 154.

In the above-mentioned embodiment, the heater 21 is provided in the tubular heating portion 122. The configuration is not limited thereto, and it may also be possible to employ a configuration in which the heating portion 122 is omitted, and the hot water is directly heated by the heater 21.

Third Embodiment

Next, a third embodiment of the present invention will be described with reference to FIGS. 9 to 12. In the following, differences from the above-described first embodiment or the above-described second embodiment will be mainly described, and components that are the same as those in the fluid-heating device 1 according to the above-described first embodiment or the fluid-heating device 100 according to the above-described second embodiment are assigned the same reference numerals and descriptions thereof will be omitted.

A fluid-heating device 200 according to the third embodiment includes a heater accommodating portion 208 that accommodates the heater 21 in a tank 210 and the protruded portion 259 that extends from the heater accommodating portion 208 along a top-plate portion 223. In the protruded portion 259, the hot water flows along the top-plate portion 223, and thereby, the heat of the top-plate portion 223 is transferred to the hot water rapidly and efficiently.

Figure 9:
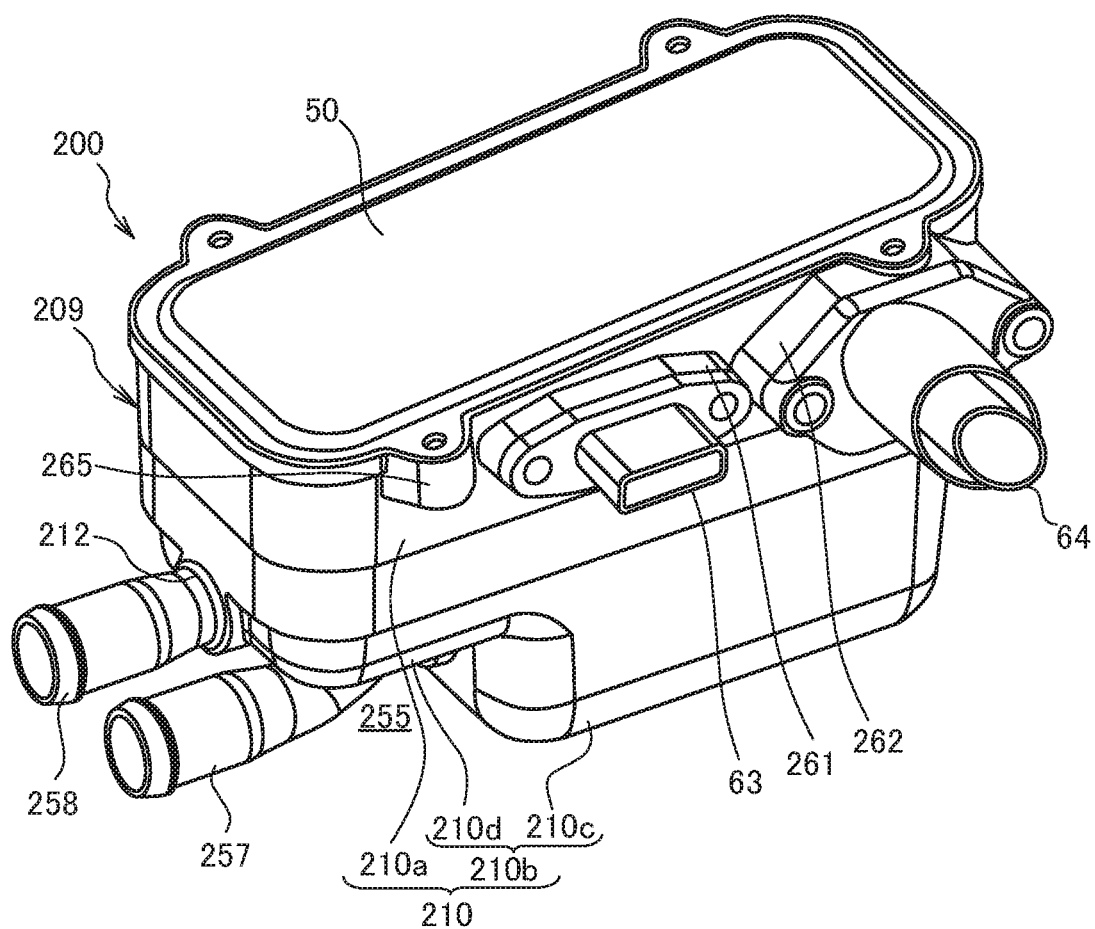
FIG. 9 is a perspective view of the fluid-heating device according to a third embodiment of the present invention.
Figure 10:
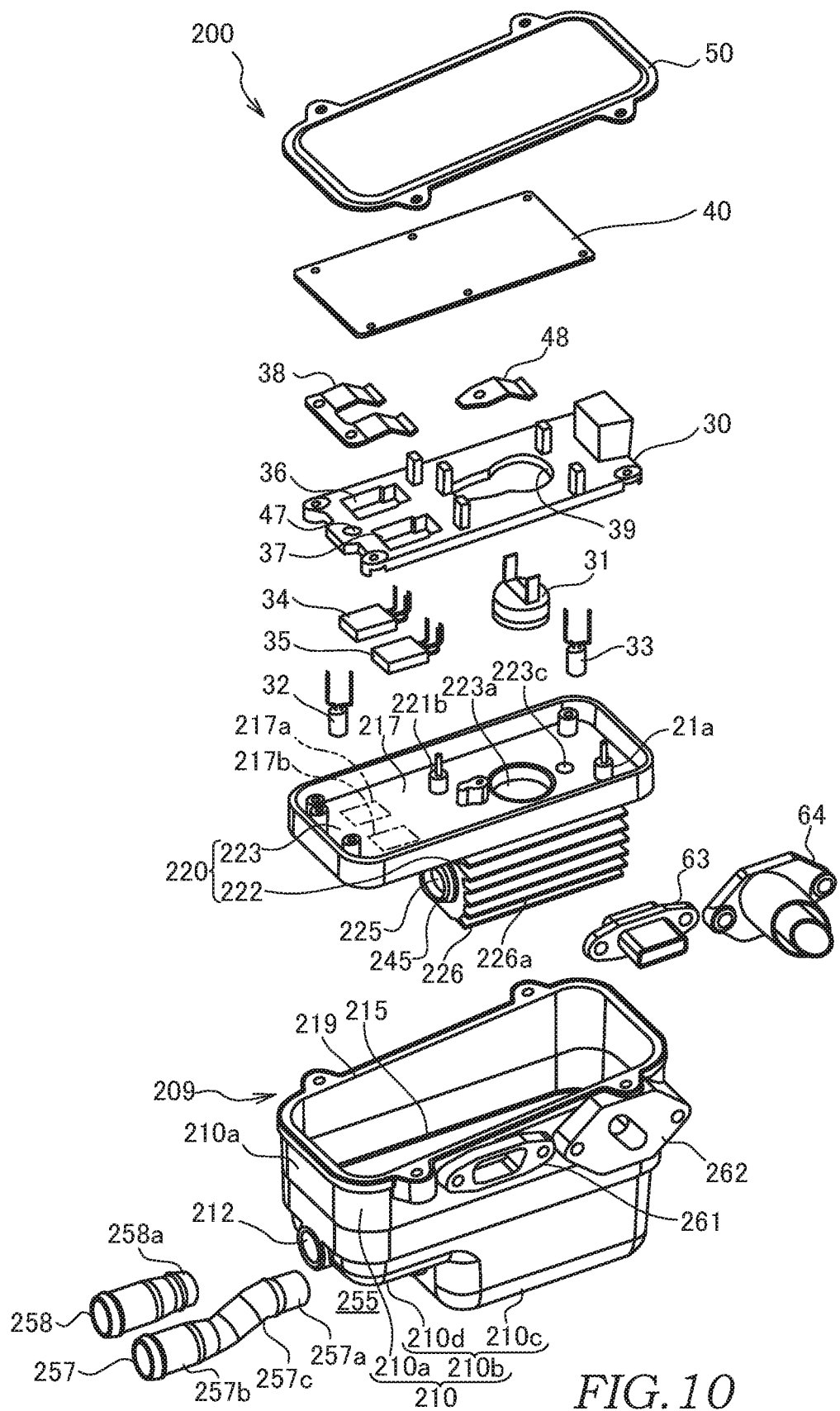
FIG. 10 is an exploded perspective view of the fluid-heating device according to the third embodiment.
Figure 11:
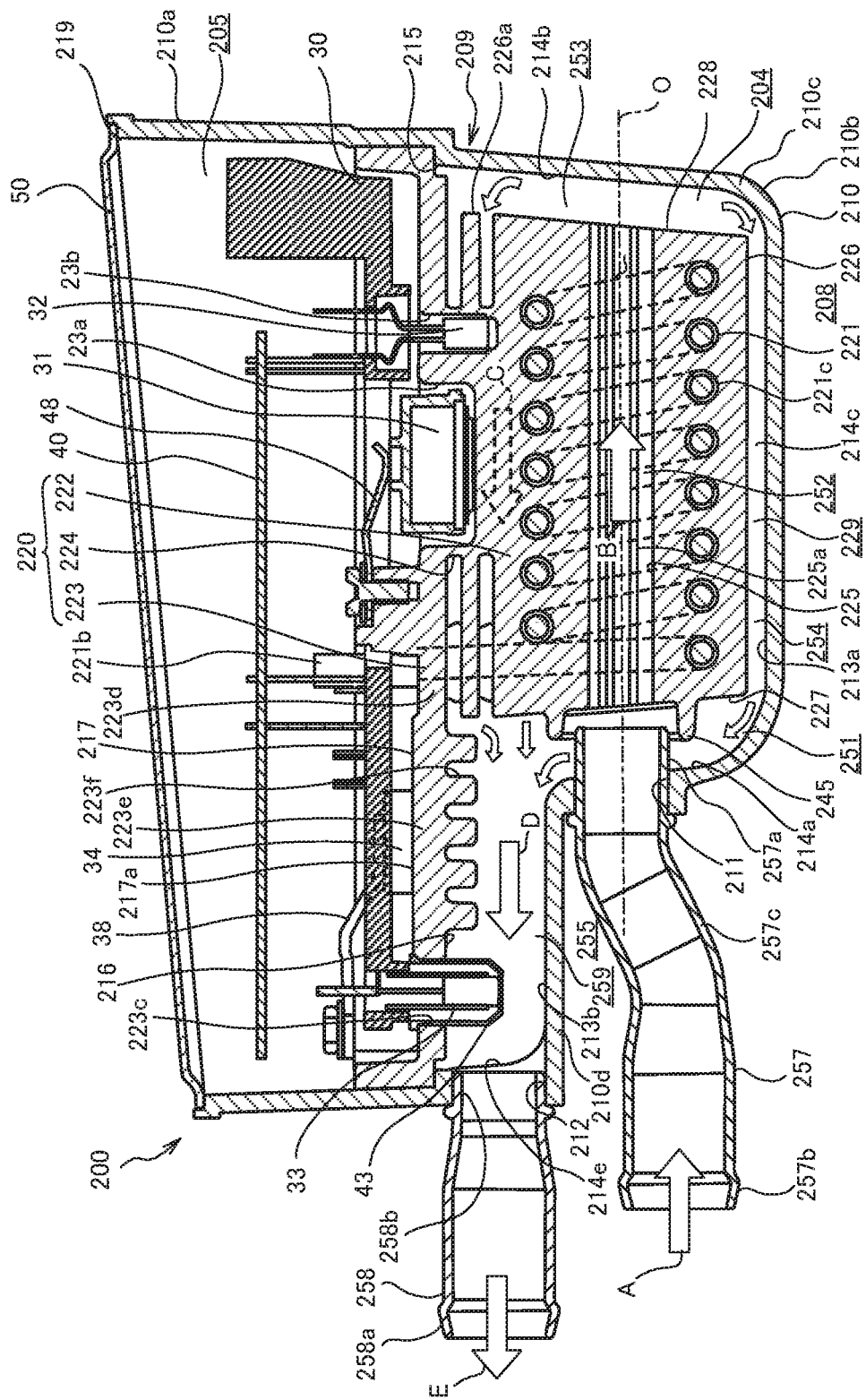
FIG. 11 is a longitudinal sectional view along the center line of the fluid-heating device according to the third embodiment.
Figure 12:
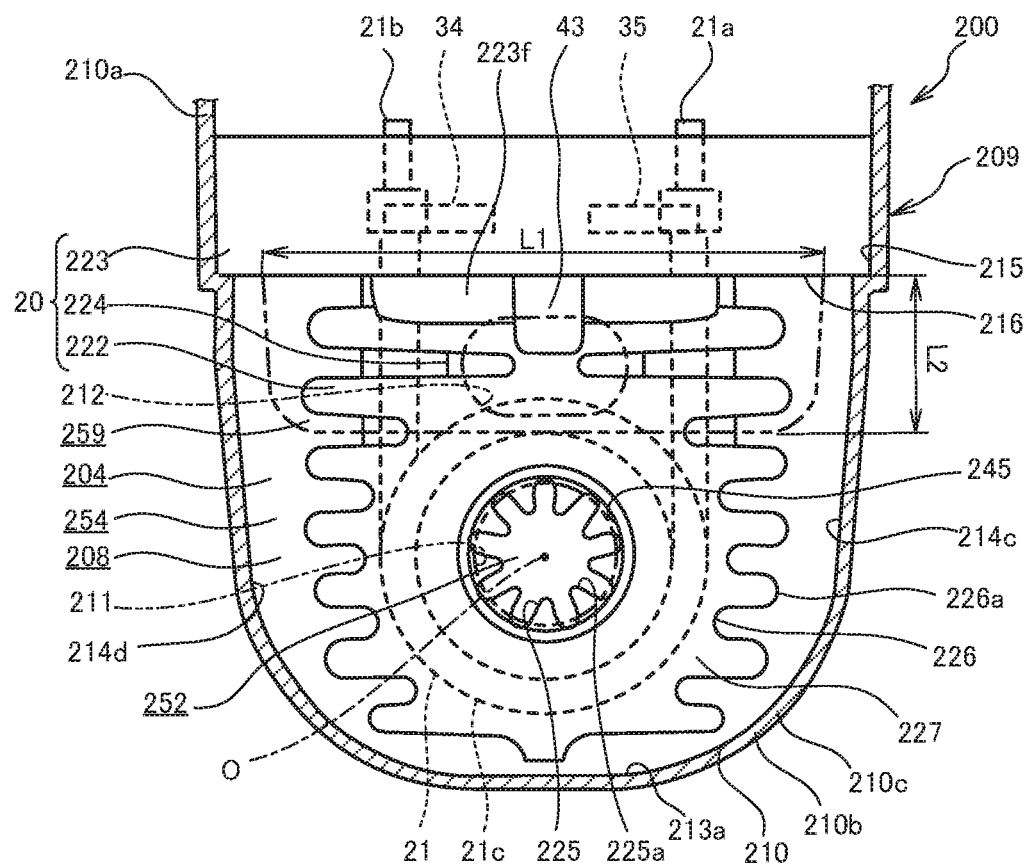
FIG. 12 is a front view of the fluid-heating device according to the third embodiment and is a diagram in which the tank is viewed in cross section.

As shown in FIGS. 9 and 10, the tank 210, heater unit 220, and the cover 50 form a case 209. As shown in FIGS. 11 and 12, in the case 209, a fluid chamber 204 that accommodates the heater 21 and through which the hot water flows is provided, and an electric-component chamber 205 (a control chamber) that accommodates the electric components is provided.

A heater unit 220 has the electric heater (hereinafter, simply referred to as "heater") 21, a block-shaped heating portion 222 that is formed so as to cover the surrounding of the heater 21, the plate-shaped top-plate portion 223 (lid portion) that forms the fluid chamber 204 between the plate-shaped top-plate portion 223 and the tank 210, and a connecting portion 224 that connects the heating portion 222 and the top-plate portion 223. In the heater unit 220, the heating portion 222, the connecting portion 224, and the top-plate portion 223 are integrally molded.

The heater 21 has the helical-shaped cast-in heat generating part 21c in the heating portion 222 and the pair of terminals 21a and 21b that project upwards from the top-plate portion 223. The heat generating part 21c may not have a helical-shape, and for example, the heat generating part 21c may be formed so as to extend back and forth in the heating portion 222. As shown in FIG. 11, the center line O of the heater 21 is a straight line penetrating through a central portion of the heater 21 (the heat generating part 21c).

The heating portion 222 has a through hole 225 that penetrates through inner side of the heat generating part 21c, an outer-wall portion 226 that is formed around the heat generating part 21c, the first-end wall portion 227 that is formed on the one end side of the heat generating part 21c, and the second wall portion 228 that is formed on the other end side of the heat generating part 21c. The heat transfer area of the outer-wall portion 226 is larger than that of the through hole 225.

The heating portion 222 has a plurality of inner circumferential fins 225a that project out from an inner circumference of the through hole 225. The plurality of inner circumferential fins 225a extend along the flowing direction of the hot water and over the entire circumference of the through hole 225 at equal angle intervals. With the inner circumferential fins 225a, the heat transfer area of an inner-circumferential flow channel 52 is increased as compared to a case in which the inner circumferential fins 225a are not provided.

The outer-wall portion 226 has a plurality of outer circumferential fins 226a that extend along the flowing direction of the hot water. With the outer circumferential fins 226a, the heat transfer area an outer circumferential flow channel 54 is increased as compared to a case in which the outer circumferential fins 226a are not provided.

The tank 210 has a fluid-chamber wall portion 210b that forms the fluid chamber 204 and an electric-component-chamber wall portion 210a that forms the electric-component chamber 205. The configuration is not limited to that in which the electric-component-chamber wall portion 210a is integrally formed with the tank 210, and it may also be possible to employ a configuration in which the electric-component-chamber wall portion 210a is integrally formed with the heater unit 220.

In the tank 210, an opening portion 215 of the fluid-chamber wall portion 210b is formed. The opening portion 215 is closed by the top-plate portion 223. The top-plate portion 223 is joined to the tank 210 by welding, etc. The top-plate portion 223 is a partition wall that partitions the fluid chamber 204 and the electric-component chamber 205.

At a top portion of the tank 210, an opening portion 219 of the electric-component-chamber wall portion 210a is formed. The opening portion 219 is closed by the cover 50. The cover 50 is fastened to the electric-component-chamber wall portion 210a by bolts (not shown) screwed into boss portions 265 of the electric-component-chamber wall portion 210a.

On side portions of the tank 210, mounting seats 261 and 262 are respectively formed. The connector 63 is attached to the mounting seat 261. The connector 64 is attached to the mounting seat 262.

As shown in FIG. 10, the top-plate portion 223 is formed with a recessed portion 223a for attaching the bimetal switch 31, a recessed portion 223b for attaching the heater temperature sensor 32, and a hole 223c for attaching the water temperature sensor 33.

The bimetal switch 31 is pressed by a plate 48 fastened to the top-plate portion 223 and held so as to be in contact with a bottom portion of the recessed portion 223a.

As shown in FIG. 11, the water temperature sensor 33 is accommodated in a cap 43 having a bottomed tube shape that is attached to the top-plate portion 223, and the water temperature sensor 33 is held so as to be in contact with a bottom portion of the cap 43. An annular space is formed between an outer circumference of the water temperature sensor 33 and an inner circumference of the cap 43.

The cap 43 is provided such that an outer circumference of an opening end portion of the cap 43 is inserted into the hole 223c of the top-plate portion 223 and that the outer circumference and the bottom portion of the cap 43 face the fluid chamber 204. The cap 43 is arranged between the IGBTs 34 and 35 and a second communication port 212 (the discharge port) and projects towards the upstream side of the second communication port 212 in the fluid chamber 204.

The IGBTs 34 and 35 are pressed by the plate 38 fastened to the top-plate portion 223 and held so as to be in contact with the top-plate portion 223. The top-plate portion 223 has an electric-component-chamber wall surface 217 that forms the electric-component chamber 205. The electric-component-chamber wall surface 217 has contact portions 217a and 217b with which the IGBTs 34 and 35 are brought into contact.

Next, the configuration of the fluid chamber 204 will be described.

The top-plate portion 223 has a fluid chamber wall surface 216 (top surface) that forms the fluid chamber 204.

The fluid-chamber wall portion 210b of the tank 210 has a heater-accommodating wall portion 210c that forms the heater accommodating portion 208 (flow channel) around the heating portion 222 (the heater 21) and a protruded-wall portion 210d that forms the protruded portion 259 (flow channel) that protrudes from the heater accommodating portion 208 along the top-plate portion 223. A first communication port 211 (the supply port) through which the hot water is supplied from the outside opens at one end of the heater-accommodating wall portion 210c. The second communication port 212 (the discharge port) through which the hot water is discharged to the outside opens at one end of the protruded-wall portion 210d.

The first communication port 211 and the second communication port 212 are arranged on the one end side (the left side in FIG. 11) of the heater unit 220. The first communication port 211 and the through hole 225 of the heating portion 222 are arranged so as to be aligned in the axial direction in which the center line O of the heater 21 extends. The second communication port 212 is arranged at a position closer to the top-plate portion 223 relative to the first communication port 211. With such a configuration, in the heater accommodating portion 208 of the fluid chamber 204, the hot water that has flowed from the first communication port 211 is directed to the second communication port 212 by flowing along the top-plate portion 223 after being turned around.

The second communication port 212 is arranged so as to offset in a direction (downward direction) away from the heater unit 220 with respect to the axial direction in which the center line O of the heater 21 extends relative to the first communication port 211. With such a configuration, in the protruded portion 259 of the fluid chamber 204, the hot water directed from the heater accommodating portion 208 to the second communication port 212 flows along the top-plate portion 223.

The fluid-chamber wall portion 210b of the tank 210 forms the fluid chamber 204 by a first wall portion 214a to a fifth wall portion 214e, a first bottom portion 213a, and a second bottom portion 213b. The first wall portion 214a to the fifth wall portion 214e are respectively formed so as to face upwards by being inclined with respect to the vertical line (the reference line). The first bottom portion 213a and the second bottom portion 213b respectively extend in the substantially horizontal direction from upper and lower ends of the first wall portion 214a (step).

The heater accommodating portion 208 has the first-end flow channel 251 and a second-end flow channel 253 provided on both sides of the heating portion 222, the inner-circumferential flow channel 252 that is provided inside the heating portion 222, and an outer circumferential flow channel 254 that is provided on the outer side of the heating portion 222.

The first-end flow channel 251 is formed between the first-end wall portion 227 of the heating portion 222 and the first wall portion 214a of the tank 210. The first communication port 211 opens at the first-end flow channel 251.

A supply pipe 257 is inserted into the first communication port 211. A piping (not shown) through which the hot water flows is connected to the supply pipe 257 projecting out from the tank 210.

As shown in FIG. 11, on the outer side of the tank 210, a recessed space 255 is formed by the heater-accommodating wall portion 210c and the protruded-wall portion 210d so as to have a recessed shape. The supply pipe 257 is arranged along the protruded-wall portion 210d and received in the recessed space 255.

The supply pipe 257 has a proximal portion 257a that is inserted into the first communication port 211, a curved portion 257c that is curved in a direction away from the proximal portion 257a with respect to the protruded-wall portion 210d, and a distal portion 257b that extends substantially in parallel with a discharge pipe 258. As described above, the supply pipe 257 is curved to have a cranked shape and arranged so as to extend so as to form a gap with the protruded-wall portion 210d.

On the first-end wall portion 227 of the heating portion 222, an annular inlet portion 245 is formed so as to open on the extending line of the through hole 225. The proximal portion 257a of the supply pipe 257 projects out into the tank 210 from the first wall portion 214a and inserted into the inlet portion 245 (the first-end wall portion 227) of the through hole 225 so as to form an annular gap. The hot water supplied from the supply pipe 257 is guided to the first-end flow channel 251 and the inner-circumferential flow channel 252.

The configuration is not limited to that described above, it may also be possible to employ a configuration in which the proximal portion 257a of the supply pipe 257 is inserted into the inlet portion 245 without forming the gap and the supply pipe 257 is connected to the through hole 225. In this case, all of the hot water supplied from the supply pipe 257 is guided to the inner-circumferential flow channel 252.

The inner-circumferential flow channel 252 is formed by the through hole 225 of the heating portion 222. The through hole 225 is formed so as to be centered on the center line O of the first communication port 211. The inner-circumferential flow channel 252 extends along the center line O (the extending line) of the first communication port 211.

The second-end flow channel 253 is formed between the second wall portion 228 of the heating portion 222 and a second wall portion 214b of the tank 210.

The second wall portion 214b is formed so as to oppose the first wall portion 214a via the heating portion 222 of the heater unit 220. The hot water that has flowed out from the inner-circumferential flow channel 252 flows into the outer circumferential flow channel 254 via the first-end flow channel 251.

The outer circumferential flow channel 254 is formed between the outer-wall portion 226 of the heating portion 222, the first bottom portion 213a of the tank 210, a third wall portion 214c, a fourth wall portion 214d, and the fluid chamber wall surface 216 of the top-plate portion 223. The flow channel area of the outer circumferential flow channel 254 that is perpendicular to the center line O is larger than that of the inner-circumferential flow channel 252.

The third wall portion 214c and the fourth wall portion 214d of the tank 210 are formed so as to oppose to each other. The heating portion 222 is arranged between the third wall portion 214c and the fourth wall portion 214d.

The protruded portion 259 is formed between an upper part of the third wall portion 214c of the tank 210, an upper part of the fourth wall portion 214d, the second bottom portion 213b, the fifth wall portion 214e, and the fluid chamber wall surface 216 of the top-plate portion 223.

As shown by the two-dot chain line in FIG. 12, the protruded portion 259 has a flat cross-sectional shape that extends along the fluid chamber wall surface 216 of the top-plate portion 223. The protruded portion 259 is formed such that a flow channel width L1 in the width direction along the fluid chamber wall surface 216 is larger than a flow channel height L2 relative to the fluid chamber wall surface 216. The flow channel area of the protruded portion 259 perpendicular to the center line O is smaller than that of the outer circumferential flow channel 254.

The fifth wall portion 214e is formed at a position farther away from the heater unit 220 relative to the first wall portion 214a so as to oppose the second wall portion 214b via the heating portion 222 of the heater unit 220. The second bottom portion 213b is provided so as to extend between a lower end of the fifth wall portion 214e and an upper end of the first wall portion 214a.

The second communication port 212 (the discharge port) that discharges the hot water from the fluid chamber 204 to the outside opens on the fifth wall portion 214e. A proximal portion 258a of the discharge pipe 258 is inserted into the second communication port 212. The discharge pipe 258 projecting out from the tank 210 is connected to a piping (not shown) for guiding the hot water to be discharged.

As shown by the two-dot chain line in FIG. 12, the second communication port 212 is formed to have a substantially oval cross-sectional shape. Similarly to the protruded portion 259, the second communication port 212 has a flat cross-sectional shape that extends along the top-plate portion 223.

The fluid chamber wall surface 216 of the top-plate portion 223 extends in a direction substantially parallel to the center line O. The top-plate portion 223 has a top-plate heater accommodating portion 223d that forms the heater accommodating portion 208 (the outer circumferential flow channel 254) between the top-plate heater accommodating portion 223d and the heating portion 222 and a top-plate protruded portion 223e that forms the protruded portion 259 between the top-plate protruded portion 223e and the protruded-wall portion 210d.

The top-plate protruded portion 223e is formed with heat releasing fins 223f that project out from the fluid chamber wall surface 216 towards the protruded portion 259. The heat releasing fins 223f project out from the portions of the fluid chamber wall surface 216 positioned on the back side of the contact portions 217a and 217b that are in contact with the IGBT 34.

A plurality of heat releasing fins 223f are formed so as to face the flowing direction of the hot water in the outer circumferential flow channel 254. The heat releasing fins 223f project out into the second-end flow channel 253 and the protruded portion 259 at the predetermined projecting amount (height) from the fluid chamber wall surface 216.

The heat releasing fins 223f are respectively formed so as to extend in the direction substantially perpendicular to the center line O and aligned so as to be separated by predetermined gaps in the center line O direction.

The heat releasing fins 223f may be respectively formed such that the projecting amount from the fluid chamber wall surface 216 is increased along the flowing direction of the hot water. In addition, the configuration is not limited to that described above, and the heat releasing fins 223f may be respectively provided so as to extend in a direction substantially parallel to the center line O.

Next, action of the fluid-heating device 200 will be described.

In the heater accommodating portion 208 of the fluid chamber 204, as shown by the arrow A in FIG. 11, the hot water that has supplied through the supply pipe 257 is guided to the inner-circumferential flow channel 252 through the first-end flow channel 251, and as shown by the arrow B, flows through the inner-circumferential flow channel 252. In the inner-circumferential flow channel 252, the hot water is heated by the heat exchange with an inner circumference of the through hole 225 on which the inner circumferential fins 225*a* are formed.

Subsequently, the hot water flowing out from the inner-circumferential flow channel 252 to the second-end flow channel 253 turns around to change its flowing direction along the second wall portion 214*b*, and as shown by the arrow C, flows through the outer circumferential flow channel 254 around the heating portion 222. In the outer circumferential flow channel 254, the hot water is heated by the heat exchange with an inner circumference of the outer-wall portion 226 on which the outer circumferential fins 226*a* are formed.

Subsequently, as shown by the arrow D, the hot water that has flowed through the outer circumferential flow channel 254 and the first-end flow channel 251 flows through the protruded portion 259 of the fluid chamber 204 and is discharged from the second communication port 212 and the discharge pipe 258 as shown by the arrow E.

The hot water flowing through the protruded portion 259 is heated by undergoing the heat exchange with the top-plate portion 223 via the fluid chamber wall surface 216 on which the heat releasing fins 223*f* are formed.

The flow speed of the hot water flowing through the protruded portion 259 is higher than the flow speed of the hot water flowing through the outer circumferential flow channel 254. Retainment and stagnation in the vicinity of the heat releasing fins 223*f* of the hot water flowing through the flat protruded portion 259 extending along the top-plate portion 223 is suppressed. With such a configuration, release of the heat of the top-plate portion 223 to the hot water is promoted.

According to the above-mentioned third embodiment, advantages shown below can be afforded.

The second communication port 212 is arranged so as to offset in a direction away from the heater 21 with respect to the first communication port 211. In this configuration, the fluid chamber 204 has the heater accommodating portion 208 that accommodates the heater 21 (the heating portion 222) and at which the first communication port 211 opens and the protruded portion 259 that extends from the heater accommodating portion 208 along the top-plate portion 223 and at which the second communication port 212 opens.

According to the above-described configuration, in the heater accommodating portion 208, the hot water flows around the surrounding of the heater 21, and thereby, the heat of the heater 21 is efficiently transferred to the hot water. In the protruded portion 259, the hot water flows rapidly along the top-plate portion 223.

Furthermore, in this configuration, the electric components, such as the IGBTs 34 and 35, etc., that control application of current to the heater 21 is provided on an outer side of the protruded portion 259 along the top-plate portion 223.

According to the above-described configuration, in the protruded portion 259, the hot water flows along the top-plate portion 223, and thereby, the heat of the top-plate portion 223 is transferred to the hot water rapidly and efficiently. With such a configuration, with the fluid-heating device 200, the top-plate portion 223 and the electric components such as the IGBTs 34 and 35, the water temperature sensor 33, and so forth are cooled sufficiently, and it is possible to suppress increase in temperature of the top-plate portion 223 and the electric components.

The configuration is not limited to that described above, and it may also be possible to employ a configuration in which the first communication port 211 and the second communication port 212 are respectively arranged on both sides (left and right hand sides in FIG. 11) of the heater 21.

In addition, the top-plate portion 223 has the electric-component-chamber wall surface 217 that forms the electric-component chamber 205 and the fluid chamber wall surface 216 that forms the fluid chamber 204. In this configuration, the protruded portion 259 is formed by the fluid chamber wall surface 216 that is positioned on the back side of the contact portions 217*a* and 217*b* where the IGBT 34 (the switching element) is in contact with the top-plate portion 223.

According to the above-described configuration, the heat generated by the IGBTs 34 and 35 is transferred via the top-plate portion 223 to the hot water flowing through the protruded portion 259. With such a configuration, the IGBTs 34 and 35 are cooled sufficiently, and an operated state controlling the electrical power supplied to the heater 21 is maintained.

In addition, in this configuration, the top-plate portion 223 has the heat releasing fins 223*f* that project out from the fluid chamber wall surface 216 towards the protruded portion 259.

According to the above-described configuration, the heat generated by the IGBTs 34 and 35 is transferred from the heat releasing fins 223*f* of the top-plate portion 223 to the hot water flowing through the protruded portion 259. The heat transfer area of the top-plate portion 223 for performing the heat exchange with the hot water becomes larger as compared to a case in which the heat releasing fins 223*f* are not provided. Thus, the heat transfer efficiency of the top-plate portion 223 for releasing heat to the hot water is improved.

In addition, in this configuration, a flow channel sectional area of the protruded portion 259 is smaller than the flow channel sectional area of the heater accommodating portion 208.

According to the above-described configuration, in the protruded portion 259, because the flow speed of the hot water is increased as compared to the heater accommodating portion 208, the heat of the top-plate portion 223 is efficiently transferred to the hot water.

In addition, in this configuration, the cross-sectional shape of the protruded portion 259 that is perpendicular to the flowing direction of the hot water has a flat shape in which the flow channel width L1 along the top-plate portion 223 is larger than the flow channel height L2 relative to the top-plate portion 223.

According to the above-described configuration, the flow speed of the hot water flowing along the top-plate portion 223 is increased, and retainment and stagnation of the flow of the hot water around the top-plate portion 223 is suppressed. With such a configuration, the heat of the top-plate portion 223 is efficiently transferred to the hot water.

In addition, in the tank 210, the recessed space 255 is formed so as to be recessed at the outer side the protruded-wall portion 210*d* forming the protruded portion 259. In this configuration, the supply pipe 257 (piping) that is connected to the first communication port 211 and that guides the hot water is arranged in the recessed space 255 (the outer side of the protruded portion 259) along the protruded-wall portion 210d.

According to the above-described configuration, because the supply pipe 257 is received in the recessed space 255 that is recessed at the outer side of the protruded portion 259 (the tank 210), the reduction of the size of the fluid-heating device 200 is made possible. With such a configuration, it is possible to mount the fluid-heating device 200 in a defined space in an engine compartment of the vehicle.

With the tank 210, because the recessed space 255 is formed so as to be recessed at the outer side of the protruded-wall portion 210d forming the protruded portion 259, the volume of the fluid chamber 204 is reduced. With such a configuration, with the fluid-heating device 200, because an amount of the hot water circulating therethrough is reduced, it is possible to promote the increase in the temperature of the hot water.

In addition, in this configuration, the supply pipe 257 (piping) has the curved portion 257c that is curved in a direction away from the protruded-wall portion 210d.

According to the above-described configuration, the supply pipe 257 extends so as to form a gap with the protruded-wall portion 210d. Therefore, wind sent from a fan (not shown) provided in the vehicle and travelling wind flow through the gap between the supply pipe 257 and the protruded-wall portion 210d. With such a configuration, stagnation of outside air around the protruded-wall portion 210d is suppressed, and release of heat from the protruded-wall portion 210d is promoted.

The heat generated by the heater 21 is also conducted to the top-plate portion 223 via the heating portion 222. In the protruded portion 259, because the hot water guided by the second communication port 212 flows along the top-plate portion 223, the heat of the top-plate portion 223 is efficiently transferred to the hot water. With such a configuration, it is possible to suppress the increase in the temperature of the top-plate portion 223 and the electric components such as the IGBTs 34 and 35, the water temperature sensor 33, and so forth.

Thus, with the fluid-heating device 200, it is possible to achieve both the improvement of the heat transfer efficiency for heating the hot water by the heater 21 and improvement of heat resistance of the electric components such as the IGBTs 34 and 35, the water temperature sensor 33, and so forth.

In addition, the heating portion 222 has the through hole 225 through which the hot water that is supplied from the first communication port 211 flows and the inlet portion 245 that opens on the extending line of the through hole 225. In this configuration, the supply pipe 257 inserted into the first communication port 211 is provided, and the supply pipe 257 is inserted into the inner circumference of the inlet portion 245 so as to form a gap.

According to the above-described configuration, the hot water supplied to the first communication port 211 is guided to the inner-circumferential flow channel 252 in the through hole 225 via the supply pipe 257 and the inlet portion 245 and is guided to the first-end flow channel 251 via the gap between the supply pipe 257 and the inlet portion 245. By changing the length of the supply pipe 257 inserted into the inner circumference of the inlet portion 245, it is possible to change proportion of the flowing mount of the hot water distributed to the inner-circumferential flow channel 252 in the through hole 225 and the first-end flow channel 251. By doing so, it is possible to adjust speed distribution of the hot water flowing around the heating portion 222 in the fluid chamber 204.

In addition, the first communication port 211 is configured so as to guide the hot water that has flowed into the heater accommodating portion 208 from the outside, and the second communication port 212 is configured so as to guide the hot water that is to flow out from the protruded portion 259 to the outside. The fluid-heating device 200 includes, as the electric components, the water temperature sensor 33 (fluid temperature sensor) that detects the temperature of the hot water flowing through the protruded portion 259. In this configuration, the water temperature sensor 33 is arranged at a position closer to the second communication port 212 (the discharge port) relative to the IGBT 34.

According to the above-described configuration, the heat generated by the IGBTs 34 and 35 is transferred via the top-plate portion 223 to the hot water flowing through the protruded portion 259, and thereby, it is possible to suppress occurrence of heat conduction to the water temperature sensor 33 via the top-plate portion 223. With such a configuration, it is possible to increase detection precision of the temperature of the hot water flowing through the fluid chamber 204. Because the water temperature sensor 33 performs detection on the hot water that has absorbed the heat of the top-plate portion 223 and that has been directed to the second communication port 212 (the discharge port), it is possible to accurately perform the detection of the temperature of the hot water to be guided from the second communication port 212 to the outside.

In addition, the top-plate portion 223 is attached with the cap 43 that projects out into the protruded portion 259. In this configuration, the water temperature sensor 33 is accommodated in the cap 43 and is in contact with the cap 43.

According to the above-described configuration, because the cap 43 is formed to have a thickness thinner than that of the top-plate portion 223, the cap 43 functions as a thermal insulation part that suppresses the transfer of the heat of the top-plate portion 223 to the water temperature sensor 33. With such a configuration, because the heating of the water temperature sensor 33 by the conduction of the heat from the top-plate portion 223 is suppressed, it is possible to increase the precision of detection of the temperature of the hot water flowing through the fluid chamber 204.

In the above-mentioned embodiment, the hot water that has been supplied from the first communication port 211 is discharged from the second communication port 212 by flowing the outer circumferential flow channel 254 and the protruded portion 259 after the inner-circumferential flow channel 252. The configuration is not limited thereto, and the hot water that has been supplied from the first communication port 211 may be discharged from the second communication port 212 by flowing the inner-circumferential flow channel 252 after the protruded portion 259 and the outer circumferential flow channel 254.

In the above-mentioned embodiment, the heater 21 is provided in the tubular heating portion 222. The configuration is not limited thereto, and the heating portion 222 may be omitted, and the heater 21 may be configured so as to directly heat the hot water.

Embodiments of this invention were described above, but the above embodiments are merely examples of applications of this invention, and the technical scope of this invention is not limited to the specific constitutions of the above embodiments.

The above-mentioned embodiments can be combined appropriately.

This application claims priority based on Japanese Patent Application No. 2015-130688 filed with the Japan Patent Office on Jun. 30, 2015, Japanese Patent Application No. 2015-198785 filed with the Japan Patent Office on Oct. 6, 2015, and Japanese Patent Application No. 2016-102133 filed with the Japan Patent Office on May 23, 2016, the entire contents of which are incorporated into this specification.

The invention claimed is:

1. A fluid-heating device for heating fluid, comprising:
a heater configured to generate heat upon application of current;
an electric component configured to control the application of the current to the heater;
a tank having an opening portion, the tank being configured to accommodate the heater;
a top-plate portion configured to close the opening portion of the tank, the top-plate portion being configured to form a fluid chamber through which the fluid flows; and
a first communication port and a second communication port configured to allow the fluid to flow through the fluid chamber, wherein
the electric component is provided on an outer side of the fluid chamber along the top-plate portion,
the first communication port and the second communication port are arranged on a same side with respect to the heater,
the first communication port is arranged so as to face the heater, and
the second communication port is arranged so as to face a portion between the first communication port and the top-plate portion, and
the top-plate portion includes a heat releasing projected portion, the heat releasing projected portion being projected out into the fluid chamber from a back side of a contact portion with which the electric component is brought into contact.

2. The fluid-heating device according to claim 1, wherein the heat releasing projected portion is provided such that a projecting amount of the heat releasing projected portion from the top-plate portion is increased along a flowing direction of the fluid around the heat releasing projected portion.

3. A fluid-heating device for heating fluid, comprising:
a heater configured to generate heat upon application of current;
an electric component configured to control the application of the current to the heater;
a tank having an opening portion, the tank being configured to accommodate the heater;
a top-plate portion configured to close the opening portion of the tank, the top-plate portion being configured to form a fluid chamber through which the fluid flows; and
a first communication port and a second communication port configured to allow the fluid to flow through the fluid chamber, and a heating portion formed so as to cover a surroundings of the heater, the heating portion being configured to heat the fluid, wherein
the electric component is provided on an outer side of the fluid chamber along the top-plate portion,
the first communication port and the second communication port are arranged on a same side with respect to the heater,
the first communication port is arranged so as to face the heater, and
the second communication port is arranged so as to face a portion between the first communication port and the top-plate portion,
the top-plate portion includes a heat releasing projected portion, the heat releasing projected portion being projected out into the fluid chamber from a back side of a contact portion with which the electric component is brought into contact, and
the heat releasing projected portion is not in contact with the heating portion.

4. A fluid-heating device for heating fluid, comprising:
a heater configured to generate heat upon application of current;
an electric component configured to control the application of the current to the heater;
a tank having an opening portion, the tank being configured to accommodate the heater;
a top-plate portion configured to close the opening portion of the tank, the top-plate portion being configured to form a fluid chamber through which the fluid flows; and
a first communication port and a second communication port configured to allow the fluid to flow through the fluid chamber, wherein
the electric component is provided on an outer side of the fluid chamber along the top-plate portion,
the first communication port and the second communication port are arranged on a same side with respect to the heater,
the first communication port is arranged so as to face the heater,
the second communication port is arranged so as to face a portion between the first communication port and the top-plate portion,
the tank includes
a first wall surface at which the first communication port and the second communication port open; and
a second wall surface configured to oppose the first wall surface with the heater located therebetween, and
the second wall surface is inclined with respect to a center line of the first communication port such that the fluid is guided to the top-plate portion, the fluid being supplied from the first communication port to the fluid chamber.

5. The fluid-heating device according to claim 4, wherein the second wall surface forms a tip-end portion of the fluid chamber between the second wall surface and the top-plate portion.

* * * * *